US006170152B1

(12) United States Patent
Ohta et al.

(10) Patent No.: US 6,170,152 B1
(45) Date of Patent: *Jan. 9, 2001

(54) APPARATUS FOR MAKING A WIRE HARNESS

(75) Inventors: Yoshinobu Ohta; Toshiaki Suzuki; Ryousuke Shioda, all of Nagoya (JP)

(73) Assignees: Harness System Technologies Research, Ltd., Aichi (JP); Sumitomo Wiring System, Ltd., Mie (JP); Sumitomo Electric Industries, Ltd., Osaka (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/934,731

(22) Filed: Sep. 22, 1997

(30) Foreign Application Priority Data

Sep. 27, 1996 (JP) .................................................. 8-256418

(51) Int. Cl.[7] ..................................................... B23P 19/00

(52) U.S. Cl. ............................ 29/747; 29/33 M; 29/749; 29/865

(58) Field of Search ............................ 29/749, 747, 748, 29/865, 866, 33 F, 33 M

(56) References Cited

U.S. PATENT DOCUMENTS 4,007,534 2/1977 Tucci .
4,333,230 * 6/1982 Funcik et al. .......................... 29/749
4,397,084 * 8/1983 Ebrey et al. ........................... 29/749
4,493,147 1/1985 Bakermans .
4,616,396 * 10/1986 Matsui ............................... 29/566.1
5,333,376 * 8/1994 Lawruk ................................. 29/861

FOREIGN PATENT DOCUMENTS 0 168 141 1/1986 (EP) .
0223330 * 5/1987 (EP) ...................................... 29/749
0 330 366 8/1989 (EP) .
2 233 585 1/1991 (GB) .

* cited by examiner

*Primary Examiner*—Carl J. Abres
(74) *Attorney, Agent, or Firm*—Oliff & Berridge, PLC

(57) ABSTRACT

Cylinders are arranged in such a manner that they correspond to a plurality of pressure-blades by one-to-one, and desired pressure-blades are pushed downward by the corresponding cylinder rods, so that the desired pressure-blades are protruded from and fixed at the lower ends of the residual pressure-blades. The thus arranged pressure-blades are lowered with respect to the connector. Then, only the pressure-blades protruding from the lower ends of the other pressure-blades can conduct the operation of pressure-connection. Due to the foregoing, after the electrical wires F have been connected to the pressure-terminals of one connector all at once, in the pressure-connecting process of the other connector, only when the desired pressure-blades are selected and the selected pressure-blades are moved along the arrangement of the pressure terminals of the other connector, the wire harness of cross-wiring can be manufactured. Therefore, it is not necessary to frequently move the pressure-blades between the connectors.

6 Claims, 26 Drawing Sheets

APPARATUS FOR MAKING A WIRE HARNESS

BACKGROUND OF THE INVENTION

1. Field of the Invention

The present invention relates to the manufacture of a wire harness in which a plurality of electric wires for the wire harness are arranged and connected with pressure to a connector having a plurality of pressure-terminals. Mainly, the present invention aims at a wire harness in which the electric wires provided between two connectors, which are arranged opposed to each other, are composed of cross-wiring. The present invention relates to an electric wire pressure-connecting machine for a wire harness. Also, the present invention relates to an apparatus for manufacturing the wire harness and also relates to a method of manufacturing the wire harness.

2. Description of the Related Art

Electrical units incorporated into an automobile are electrically connected with each other by a wire harness. For example, as shown in FIGS. 25A to 26B, this wire harness is composed in such a manner that a plurality of connectors $C_1$, $C_2$ . . . (general reference character: C) are connected with each other by a plurality of electrical wires F, . . . Concerning the arrangement of the electrical wires F, as shown in FIGS. 25A and 26A, reference characters $W_1$ and $W_3$ represent an arrangement in which all electrical wires are arranged in parallel with each other between the connectors C. As shown in FIGS. 25B and 26B, reference characters $W_2$ and $W_4$ represent an arrangement in which a portion of the electrical wires or all electrical wires cross each other. Further, reference character $W_4$ represents an arrangement of a crossover wiring F" between the connectors.

In general, in the wire harness, the electrical wire F is connected to the connector C in such a manner that a terminal is crimped to an end of the electrical wire and then inserted into a cavity formed in the connector C. However, when the above crimped-connection is conducted, it is necessary to provide a large number of processes. Therefore, when the wire harness is manufactured recently, the method of pressure-connection, the number of working processes of which is small, is adopted to connect the electrical wire F to the connector C.

This connection with pressure (referred to as pressure-connection hereinafter) is conducted as follows. The electrical wire F, the outer diameter of which is a little larger than the groove width of the pressure-terminal of the connector C, is pushed into the groove (U-slot) of the pressure-terminal of the connector C using a jig or a press machine, and the electrical wire is fixed in the groove by the action of spring-back of the pressure-terminal. At this time, not only the electrical wire F is fixed, but also the cover of the electrical wire is torn by the inner wall of the groove when the electrical wire F is pushed into the groove, so that the conductor of the electrical wire is contacted with the inner wall of the terminal for electrical communication (shown in FIGS. 5 and 6). The wire harness $W_1$, $W_2$, . . . (general reference character: W) is generally manufactured as follows.

In this connection, in order to simplify the explanations, as shown in FIGS. 27A and 27B, the wire harness W to be manufactured is composed of a pair of connectors $C_1$ and $C_2$, and electrical wires F ($F_1$, $F_2$, $F_3$ and $F_4$) which are arranged between both connectors $C_1$ and $C_2$. Also, as shown in FIGS. 27A and 27B, four pressure-terminals $T_{11}$, $T_{12}$, $T_{13}$ and $T_{14}$ are respectively attached to the connector $C_1$, and four pressure-terminals $T_{21}$, $T_{22}$, $T_{23}$ and $T_{24}$ are respectively attached to the connector $C_2$. In this case, these pressure-terminals are represented by the general reference character T. In FIG. 27A represents a parallel wiring, and FIG. 27B represents a cross wiring. Concerning the apparatus in which the above pressure-connecting process is conducted, the specific structure is explained in detail in the embodiment. Therefore, the apparatus is not shown here, and only a model is illustrated in FIGS. 28A to 28D.

In general, in this pressure-connecting apparatus, the electrical wires are connected to the connector C with pressure one by one. As shown in FIGS. 28A to 28D, this pressure-connecting apparatus includes: a pressure-blade 61 for connecting the electrical wires F to the pressure-terminal of the connectors $C_1$ and $C_2$ with pressure; an electrical wire feed section 62 for feeding the electrical wires F to a portion close to the end of the pressure-blade 61 on the pressure-connection side; and a cutting blade 63 for cutting the electrical wires. All parts are moved in the three dimensional directions by a moving mechanism not shown in the drawing. In this way, there is formed a pressure-connecting and wiring head (pressure-connecting and wiring machine) by which the electrical wires F are connected to the connectors $C_1$ and $C_2$ with pressure and the electrical wires F are drawn out so as to lay electrical wires between the connectors $C_1$ and $C_2$. In FIGS. 28A to 28D, reference numeral 64 is a lower blade for cutting the electrical wires F in cooperation with the cutting blade 63.

First, as shown in FIG. 28A, two connectors $C_1$ and $C_2$ are set at predetermined positions on the working table 65. The pressure-blade 61 of the pressure-connecting and wiring head is moved immediately above the groove of the pressure-terminal $T_{11}$ of one $C_1$ of the connectors. During this movement or immediately after the completion of movement, the electrical wires F are fed from the electrical wire feed section 62 to a space between the pressure-blade 61 and the pressure-terminal.

Successively, as shown in FIG. 28B, the pressure-blade 61 is lowered and connects the electrical wire F to the groove of the pressure-terminal $T_{11}$ with pressure. Although not shown in the drawing, after the completion of pressure-connection, the pressure-blade 61 is moved upward and set at a high position where the pressure-blade 61 is completely separate from the connector $C_1$. Then, the pressure-connecting and wiring head is moved horizontally, and the pressure-blade 61 comes to a position immediately above the groove of the pressure-terminal $T_{21}$ of the other $C_2$ of the connectors. During this movement, the electrical wire F is drawn out from the electrical wire feed section 62, and the electrical wire F is laid between the pressure-terminals $T_{11}$ and $T_{21}$ of the connectors $C_1$ and $C_2$.

After the horizontal movement of the pressure-connecting and wiring head has been completed, as shown in FIG. 28C, the pressure-blade 61 is lowered again and connects the electrical wire to the groove of the pressure-terminal $T_{21}$ with pressure. At this time, simultaneously with the pressure-connection, or immediately after the pressure-connection as shown in FIG. 28D, after the pressure-blade 61 has been moved upward, the cutting blade 63 is lowered and cuts the electrical wire which extends from the pressure-terminal $T_{21}$ of the connector $C_2$ to the right in the drawing. In this way, the connection between the pressure-terminals $T_{11}$ and $T_{21}$ is completed, and the electrical wire $F_1$ is arranged.

After that, the pressure-connecting and wiring head is moved upward and set at a high position where both pressure-blades 61 and the cutting blade 63 are completely separate from the connector $C_2$. Then, the pressure-connecting and wiring head is moved to the left in FIG. 28A and set at a position where the pressure-blade 61 is located immediately above the groove of the second pressure-terminal $T_{12}$ of the connector $C_1$. At this time, when the pressure-connecting and wiring head is moved, the electrical wires are not drawn out, but only the head is moved.

In the above state, the electrical wire F is connected again to the groove of the pressure-terminal $T_{12}$ of the connector $C_1$. In the same manner as described above, the pressure-connecting head (pressure-blade 61) is lowered (pressure-connected) and moved upward. Then the pressure-connecting head (pressure-blade 61) is moved horizontally, that is, wiring is conducted. In this way, the pressure-terminal $T_{12}$ is connected to the pressure-terminal $T_{22}$. The pressure-terminal $T_{13}$ is connected to the pressure-terminal $T_{23}$. The pressure-terminal $T_{14}$ is connected to the pressure-terminal $T_{24}$. At the same time, the electrical wires $F_2$, $F_3$ and $F_3$ are arranged. In this way, the manufacture of the wire harness W is completed.

The above manufacturing process can be applied to not only the parallel wiring $W_1$, $W_3$ shown in FIGS. 25A and 26A but also the cross wiring $W_2$, $W_4$ shown in FIGS. 25B and 26B. For example, as shown in FIG. 27B, the pressure-terminals $T_{11}$ and $T_{24}$ are connected to the electrical wire F with pressure, and the pressure-terminals $T_{14}$ and $T_{21}$ are connected to the electrical wire F with pressure, so that the electrical wires cross each other. In the manufacturing process, when the number of the electrical wires arranged between the connectors is four, it is necessary for the pressure-connecting and wiring head to be horizontally reciprocated by four times, and when the number of the electrical wires arranged between the connectors is "n", it is necessary for the pressure-connecting and wiring head to be horizontally reciprocated by "n" times.

When a plurality of electrical wires F are connected to the connector C with pressure one by one as described above, it is advantageous in that the above method can be applied to various wiring specifications. However, when the above method is applied, it is necessary for the pressure-connecting and wiring head to be moved for each electrical wire. Therefore, the connecting work becomes very complicated.

In order to simplify the above movement of the pressure-connecting and wiring head, with respect to the wire harness $W_1$ shown in FIG. 25A in which all electrical wires F are arranged in parallel with each other between the connectors C, a plurality of pressure-blades 61 are arranged, and all electrical wires are connected to the connector C with pressure all at once. Due to the foregoing, as long as the integrated pressure-blades 61, the number of which is the same as the number of the electrical wires, are used, the pressure-connecting and wiring head may be reciprocated between the connectors C in the transverse direction in FIGS. 25A and 25B only once, irrespective of the number of the electrical wires arranged between both connectors C. Further, both connectors C may be moved in the vertical direction only once for the pressure-connection. Therefore, the number of movements of the head can be remarkably reduced, and the working efficiency can be enhanced.

However, in the case of a cross-wiring and also in the case of a wiring in which the numbers of pressure-connections of the connectors C are different from each other and also in the case of a crossover-wiring shown in FIGS. 25B, 26A and 26B, concerning the wire harness W, it is impossible to use the pressure-blade 61 in which a plurality of pressure-blades are integrated into one body, because the number and the position of pressure-connections can not be changed in each pressure-connecting action.

Therefore, concerning the wire harness W of cross-wiring, at present, they have no option but to use the method in which one set of the pressure-blade 61 and the cutting blade 63 are used for connecting the electrical wires F, F" with pressure one by one and also the head composed of only the electrical wire feed section 62 is used, and these parts are frequently moved for the pressure-connecting motion.

However, the structure of electrical units becomes complicated in these days, and the wire harness $W_1$, in which all electrical wires F are arranged in parallel with each other, is seldom used, and most of the wire harness are of the type of cross-wiring W.

SUMMARY OF THE INVENTION

It is an object of the present invention to effectively manufacture a wire harness of cross-wiring except for the parallel wiring having the same number and the same length of electrical wires without moving the pressure-connecting and wiring head frequently.

In order to solve the above problems, the present invention is to provide an electric wire pressure-connecting machine for a wire harness in which a plurality of electric wires for the wire harness are arranged and connected to connectors with pressure via a plurality of pressure-terminals attached to the connectors, includes: a plurality of pressure-blades arranged corresponding to the plurality of pressure-terminals by one-to-one, each of the pressure-blade being movable independently in a pressure-connecting direction which connects the electric wire to the pressure-terminal with pressure.

Due to the foregoing, it is possible to make an arbitrary number of pressure-blades to participate in the pressure-connecting work at arbitrary positions. For example, the present invention is to provide a method of manufacturing a wire harness in which both ends of a plurality of parallel electric wires are respectively connected to the connectors with pressure, comprising the steps of: connecting the plurality of electric wires to one of the connectors with pressure all at once while the pressure-blades, the number of which corresponds to the number of electrical wires and the positions of which correspond to the positions of electrical wires, are acted; connecting a portion of the plurality of electric wires to the other of the connectors while the electric wires cross other electric wires and face the corresponding pressure-terminals and the corresponding pressure-blades are acted; and connecting the plurality of electric wires to the corresponding pressure terminals with pressure all at once while the electric wires face the pressure-terminals. According to the above method, the frequency of movement between the connectors may be one. In this case, the movement is defined as a relative movement between the pressure-connecting machine and the connector when either the pressure-connecting machine or the connector is moved.

BRIEF DESCRIPTION OF THE DRAWINGS

FIGS. 2A and 2B are views showing examples of the sheath, wherein FIG. 2A is an overall perspective view of one example, and FIG. 2B is a partial perspective view of another example;

DETAILED DESCRIPTION OF THE PREFERRED EMBODIMENTS

<Embodiment of Wire Harness Manufacturing Apparatus>

Figure 1:
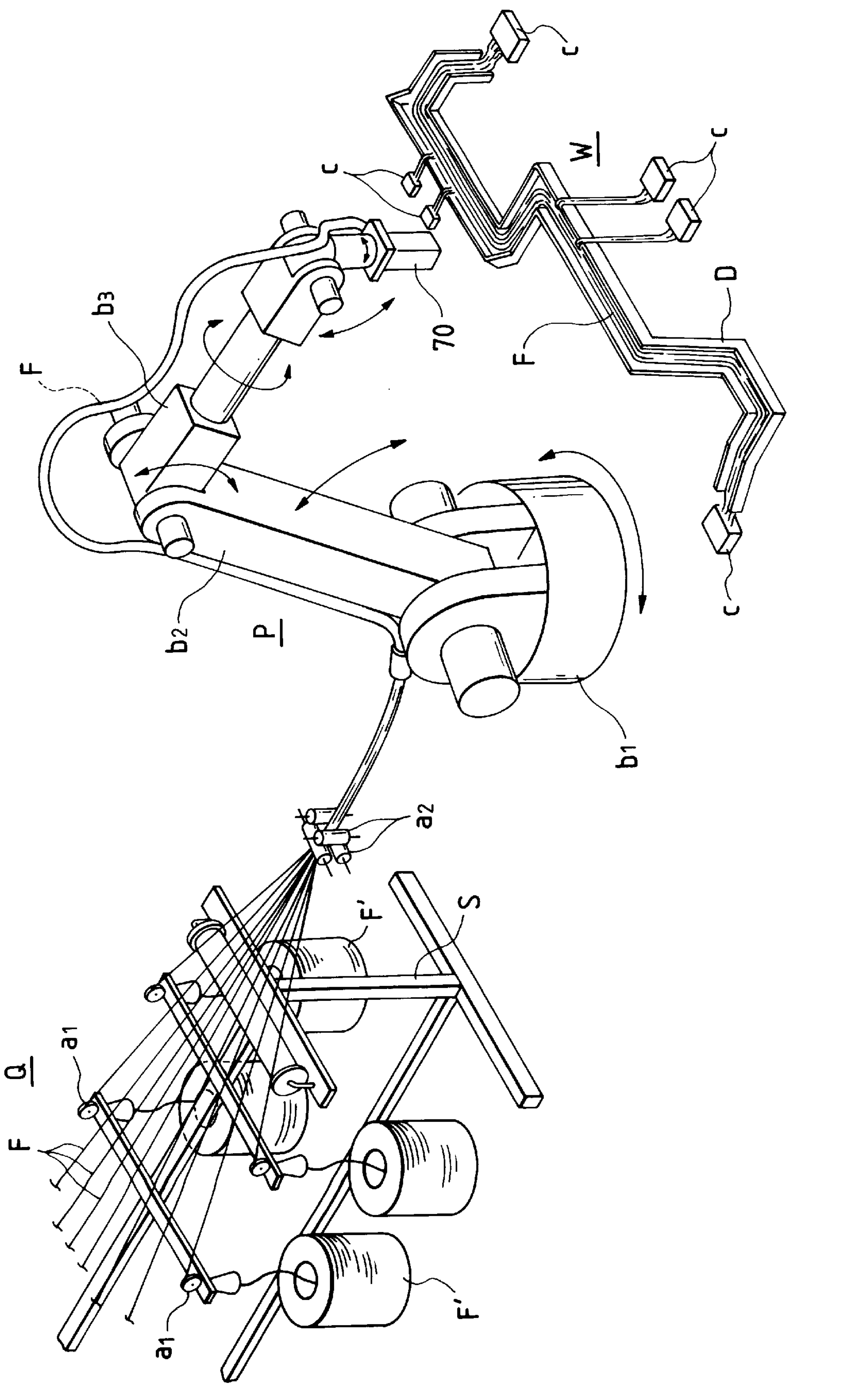
FIG. 1 is a perspective view showing an outline of an embodiment of the manufacturing apparatus of the present invention.
Figure 2A:
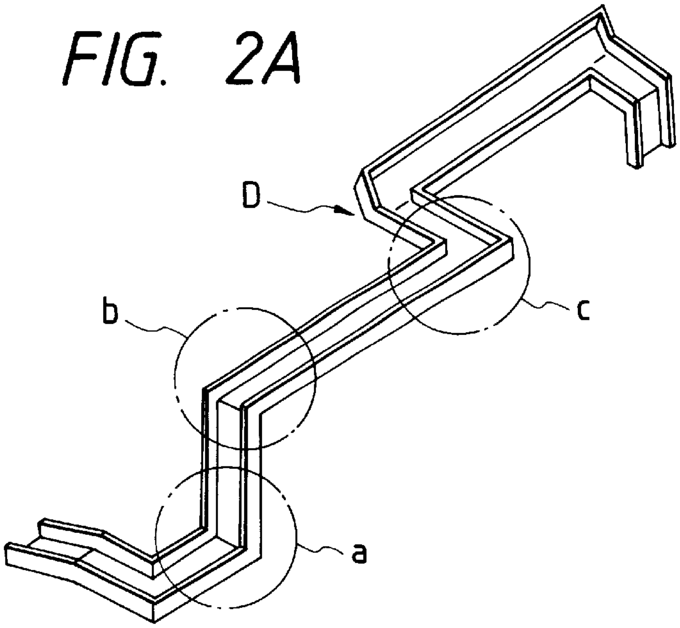
Figure 2B:
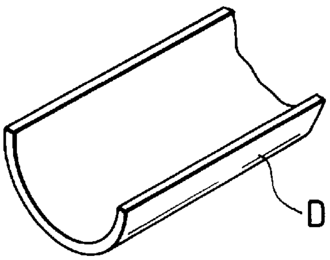

FIGS. 1 to 9 are views showing an embodiment of the apparatus for manufacturing a wire harness W for automobile use. In these views, reference character Q is an electric wire feed machine, reference character P is a pressure-connecting and wiring robot, and reference character W is a wire harness.

The electrical wire feed machine Q includes a supply stand S in which a plurality of electrical wire bundles F' are provided in such a manner that the electrical wire bundles F' can be arbitrarily replaced. From each electrical wire bundle F', the electrical wires F are drawn our and guided to the pressure-connecting and wiring robot P via the guide sheave $a_1$ and the guide roller $a_2$. The number of electrical wires F to be drawn out is arbitrarily determined, and the electrical wires F are drawn out by the robot P.

The pressure-connecting and wiring robot P is composed as follows. There is provided a rotary mount $b_1$, which can be rotated freely, on a base not shown in the drawing. The first arm $b_2$ is attached to the rotary mount $b_1$ while the first arm $b_2$ can be freely oscillated. The second arm $b_3$ is attached to the first arm $b_2$ while the second arm $b_3$ can be freely rotated and oscillated. The pressure-connecting and wiring machine 70, which is a pressure-connecting and wiring head, is attached to the second arm $b_3$, and this pressure-connecting and wiring machine 70 can be freely oscillated. Consequently, when the pressure-connecting and wiring machine 70 is moved in the three dimensional directions, the electrical wires F fed from the electrical wire feed machine Q can be laid. The pressure-connecting and wiring machine 70 can be rotated round the vertical central axis as shown by an arrow in the drawing.

As shown in FIG. 1, the wire harness W is composed in such a manner that the electrical wires F are laid in the gutter-shaped sheath D, and their ends are connected to the connectors C with pressure. The sheath D is made of synthetic resin to be bent easily such as polyvinyl chloride (PVC), polyethylene (PE) and polypropylene (PP). Alternatively, the sheath D is made of metal such as aluminum, the profile of which can be maintained stably. Concerning the cross-section of the sheath D, not only the C-shape shown in FIG. 2A but also the U-shape shown in FIG. 2B can be applied, and further various shapes such a partially cutaway circle can be applied. In the case where the gutter-shaped sheath is adopted, the width of the bottom and the height of the side wall can be appropriately determined in accordance with the number of the electrical wires F. In the case where the sheaths of other shapes are adopted, the circumstances are the same.

This pressure-connecting and wiring robot P is operated in accordance with a predetermined program, and the pressure-connecting and wiring machine 70 is operated three-dimensionally, that is, the pressure-connecting and wiring machine 70 is operated in the three-dimensional directions (directions of axes X, Y and Z). Therefore, while the electrical wires F are being drawn out from the electrical wire feed machine Q, predetermined electrical wires are laid in the sheath D. When the electrical wires are laid in the sheath D at this time, it is preferable that an adhesive layer is provided inside the sheath so that the electrical wires F can adhere onto the inner surface of the sheath simultaneously with wiring. When the electrical wires F are laid in the sheath, it is preferable to push the electrical wires F against the sheath by a roller "d" attached to the pressure-connecting and wiring machine 70, and this roller "d" can be freely moved upward and downward (shown in FIG. 3). The start point and the end point are connected to the predetermined terminals with pressure. Concerning the electrical wires F, it is possible to adopt various electrical wires such as enamel wires and insulating covered wires.

Figure 3A:
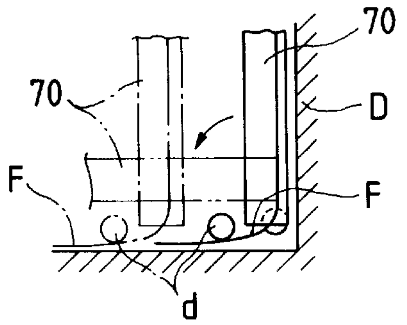
FIGS. 3A to 3C are schematic illustrations showing an action of an embodiment of the manufacturing apparatus.
Figure 3B:
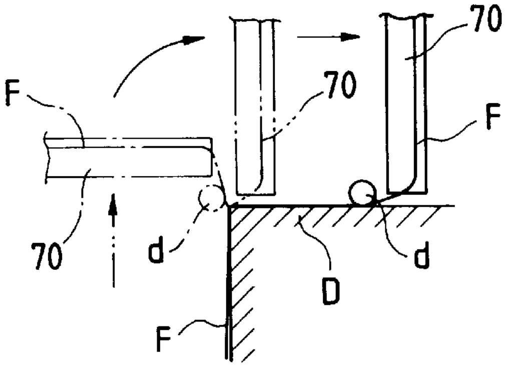
Figure 3C:
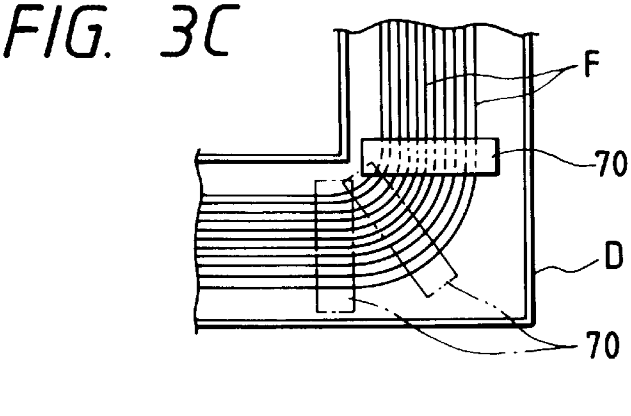

When the electrical wires are laid in the sheath, the wiring and pressure-connecting machine 70 is operated as follows. For example, in the case of the sheath D, the shape of which is described in FIG. 2A, the moving direction of the machine is changed from the horizontal direction to the vertical direction in the section "a". Therefore, as shown in FIG. 3A, the machine is moved while it changes the moving direction in such a manner that one-dotted chain line→solid line→two-dotted chain line. In the section "b", the moving direction of the machine is changed from the vertical direction to the horizontal direction. Therefore, as shown in FIG. 3B, the machine is moved while it changes the moving direction in such a manner that one-dotted chain line→two-dotted chain line→solid line. In the section "c", the moving direction of the machine is changed to the vertical direction on the horizontal surface. Therefore, as shown in FIG. 3C, the machine is moved while it changes the moving direction in such a manner that one-dotted chain line→two-dotted chain line→solid line.

Figure 4:
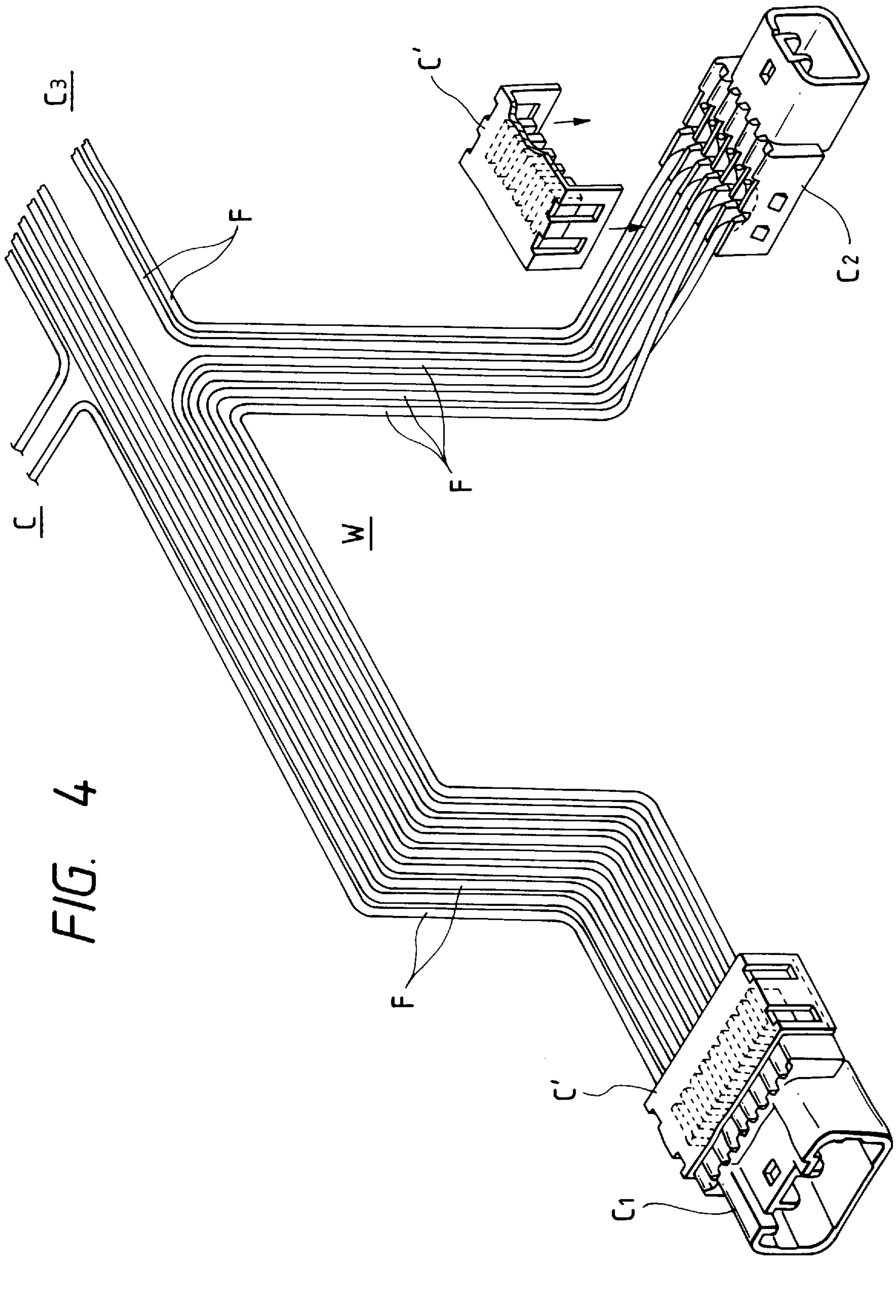
FIG. 4 is a schematic illustration of the wiring of a wire harness.

By this pressure-connecting and wiring machine 70 (robot P), for example, as shown in FIG. 4, all electrical wires are simultaneously laid between the connectors C. For example, in FIG. 4, four electrical wires F are laid from the connector $C_1$ to the connector $C_2$. Accordingly, four electrical wires F are drawn out between the connector $C_1$ and the connector $C_2$, and both ends are connected to the connector $C_1$ and the connector $C_2$ with pressure. Four electrical wires F are laid from the connector $C_1$ to the connector $C_3$. Accordingly, four electrical wires F are drawn out between the connector $C_1$ and the connector $C_3$, and both ends are connected to the connector $C_1$ and the connector $C_3$ with pressure.

When it is allowed that the electrical wires F are sagged, the following procedure may be adopted. The electrical wires F are connected to all pressure-terminals of the connectors $C_1$ with pressure all at once. At the connector $C_2$, four electrical wires thereof are pressure-connected and cut, and the thus cut electrical wires F are connected to other pressure-terminals with pressure so that they can be used for wiring of the connector $C_3$. Then, the electrical wires are connected to the connector $C_3$ with pressure.

When the electrical wires F cross each other in this wiring operation (shown in FIGS. 25B and 26B), they are connected to the connectors with pressure by the action described later (shown in FIGS. 20 and 21).

Figure 5:
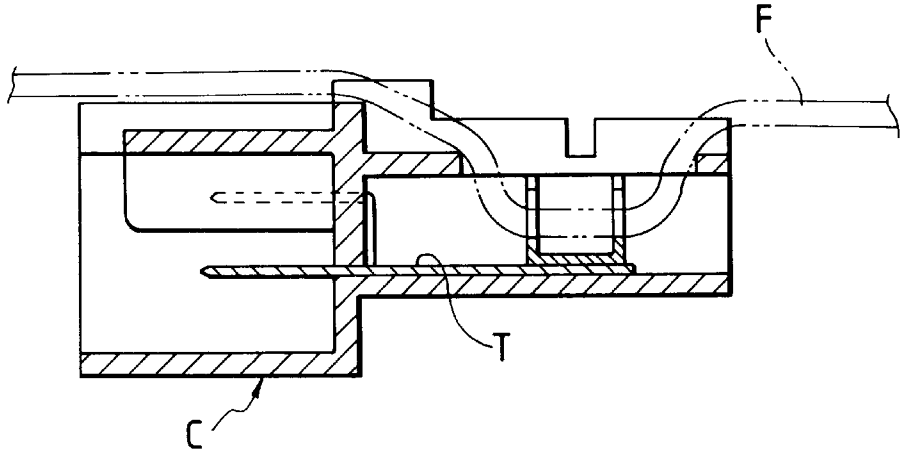
FIG. 5 is a cross-sectional view of a connector.
Figure 6:
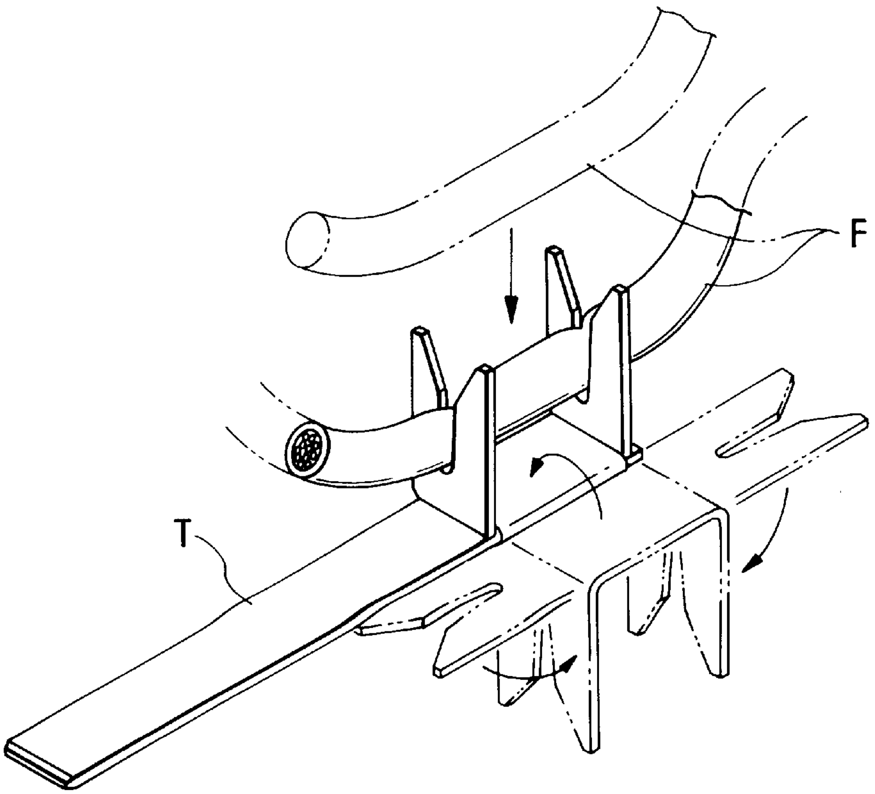
FIG. 6 is a perspective view of a pressure-terminal.
Figure 7:
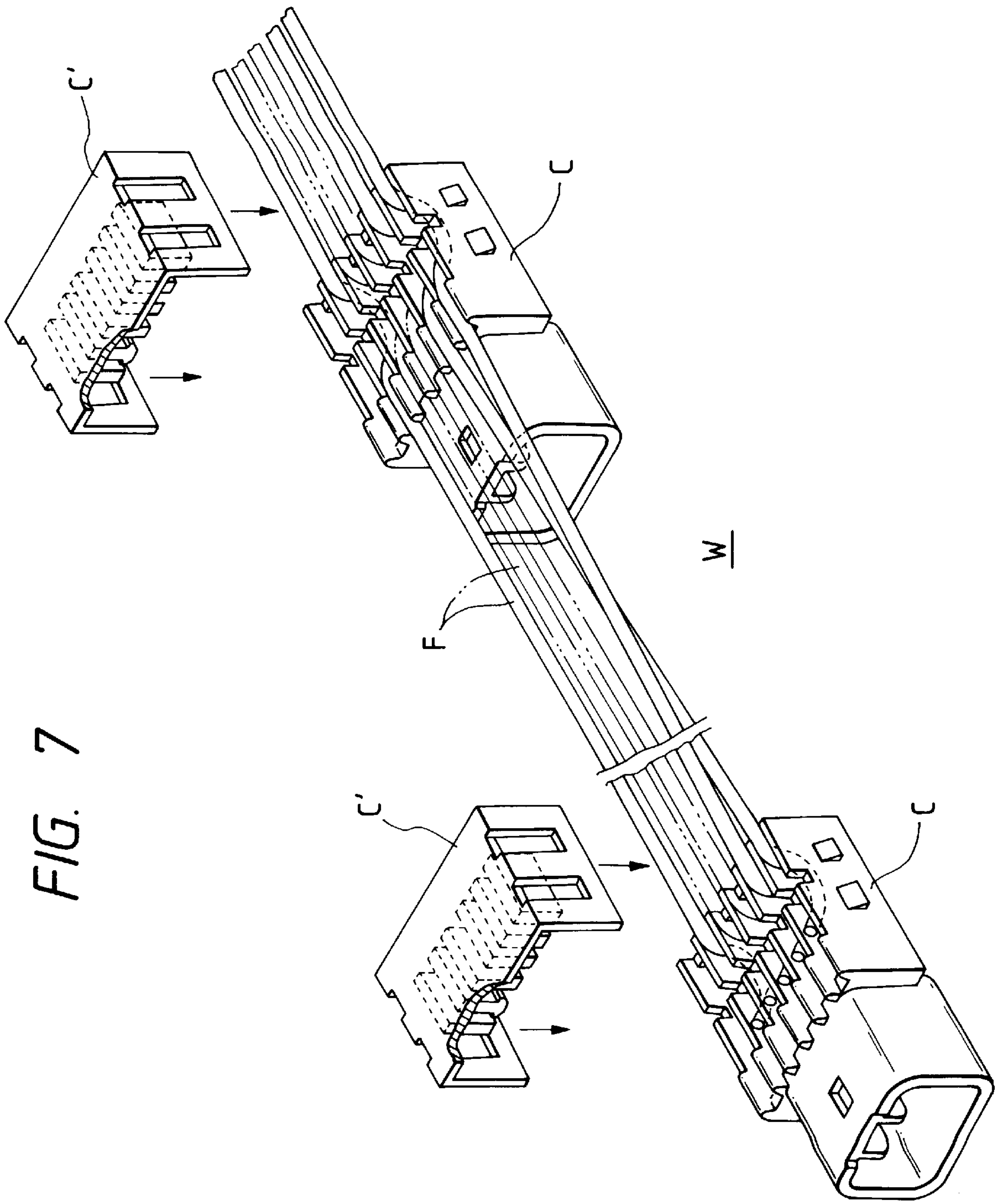
FIG. 7 is a partial perspective view of an example of the wire harness.
Figure 8:
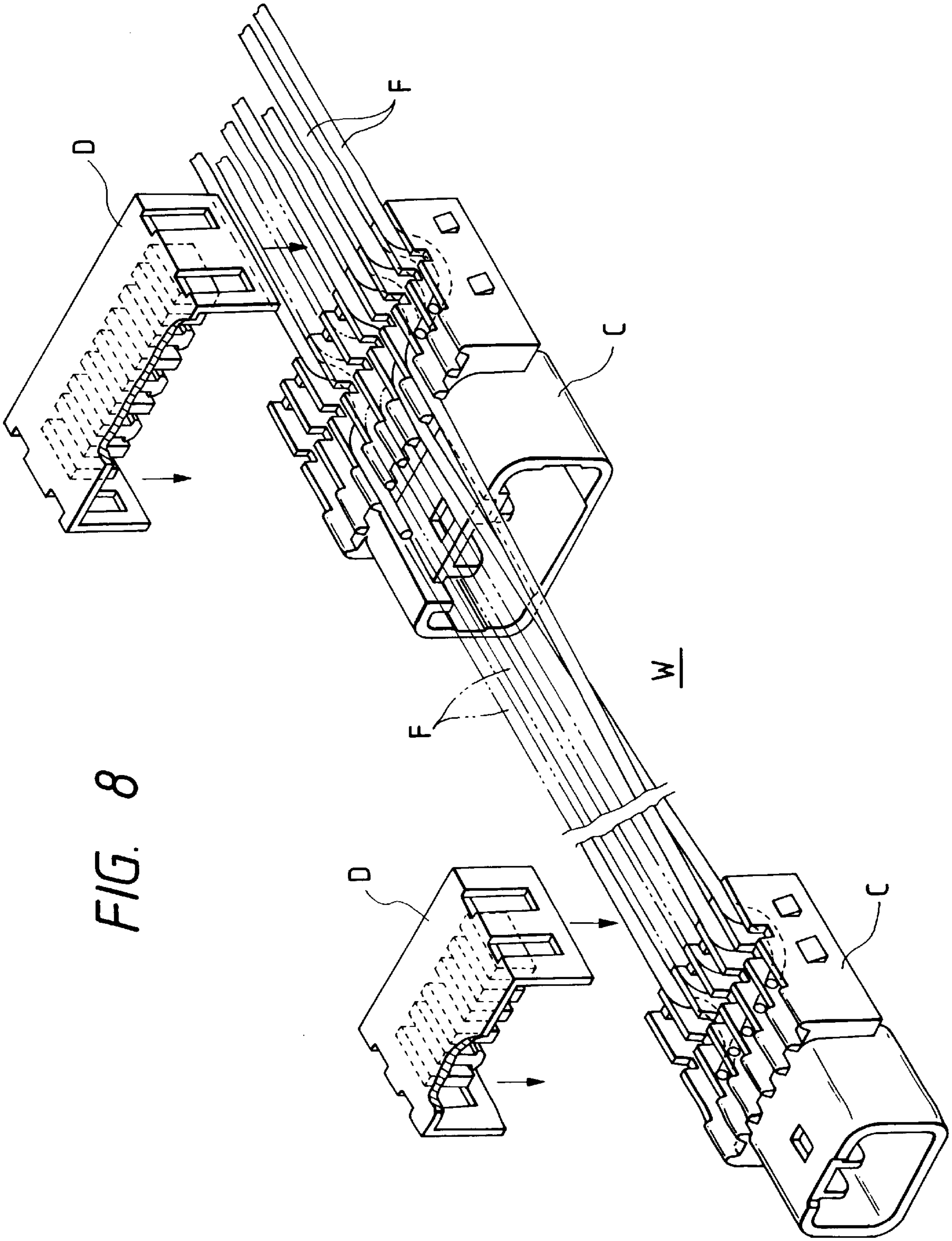
FIG. 8 is a partial perspective view of another example of the wire harness.

The cross-sectional shape of the connector C is shown in FIGS. 5. The shape of the terminal T is shown in FIG. 6. The terminal T is formed by bending a piece of material so that it can be raised from the shape shown by chain lines to the shape shown by solid lines. The thus formed terminal T is inserted into the connector housing C. The electrical wire F is press-fitted into the slot of the terminal T.

After all wiring has been laid between the connectors, a cover is put on the opening of the sheath D so as to close up the electrical wires. In this way, the manufacture of the wire harness W is completed. Instead of the cover, the inside of the sheath D may be filled (molded) with resin. Covering the opening or molding the resin may be conducted at another site after the sheath has been moved. Due to the foregoing, when a new sheath D is fed to the robot P, it is possible to conduct the operation of wiring and covering continuously. After all electrical wires F have been connected to the connector C with pressure, or alternatively after all wiring and pressure-connecting has been completed, the cover C' is put on the connector C.

In this embodiment, electrical wires are laid in the three-dimensional sheath D. However, it should be noted that this embodiment can be applied to the wire harness W shown in FIGS. 7 and 8 composed of only the electrical wires F and the connectors C before they are incorporated into an automobile. When the wire harness W is connected to the connectors C in the middle of the wire harness with pressure, an appropriate pressure-blade may be moved downward so as to cut the wires. In this case, the wire harness W shown in FIGS. 7 and 8 can be obtained. In this connection, the connector C is set at a predetermined position manually or automatically by an automatic machine.

Figure 9:
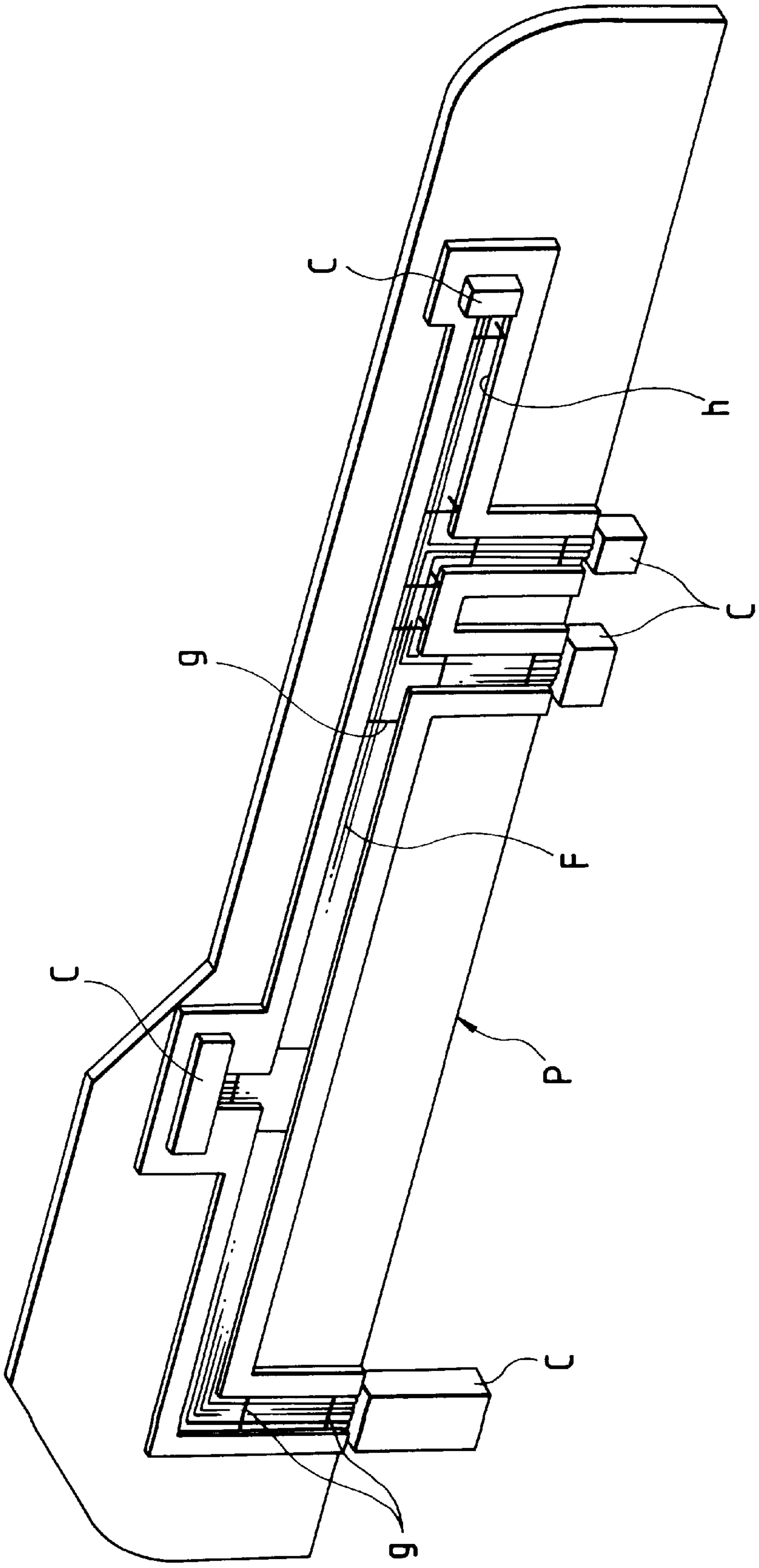
FIG. 9 is a view showing the wiring of another wire harness.

In the above embodiment, the electrical wires are laid in the sheath D. However, as shown in FIG. 9, the electrical wires may be arranged on the instrument panel P as follows. A wiring groove "h" is formed on the instrument panel P, and the electrical wires F are laid in the wiring groove "h" in the same manner as described above. Then the connectors C are attached to the electrical wires so as to form a wire harness W. In the drawing, reference character "g" is a clip to fasten the wire harness W. In this way, wiring can be laid on not only the instrument panel P but also the door.

<Another Embodiment of Wire Harness Manufacturing Apparatus>

Figure 10:
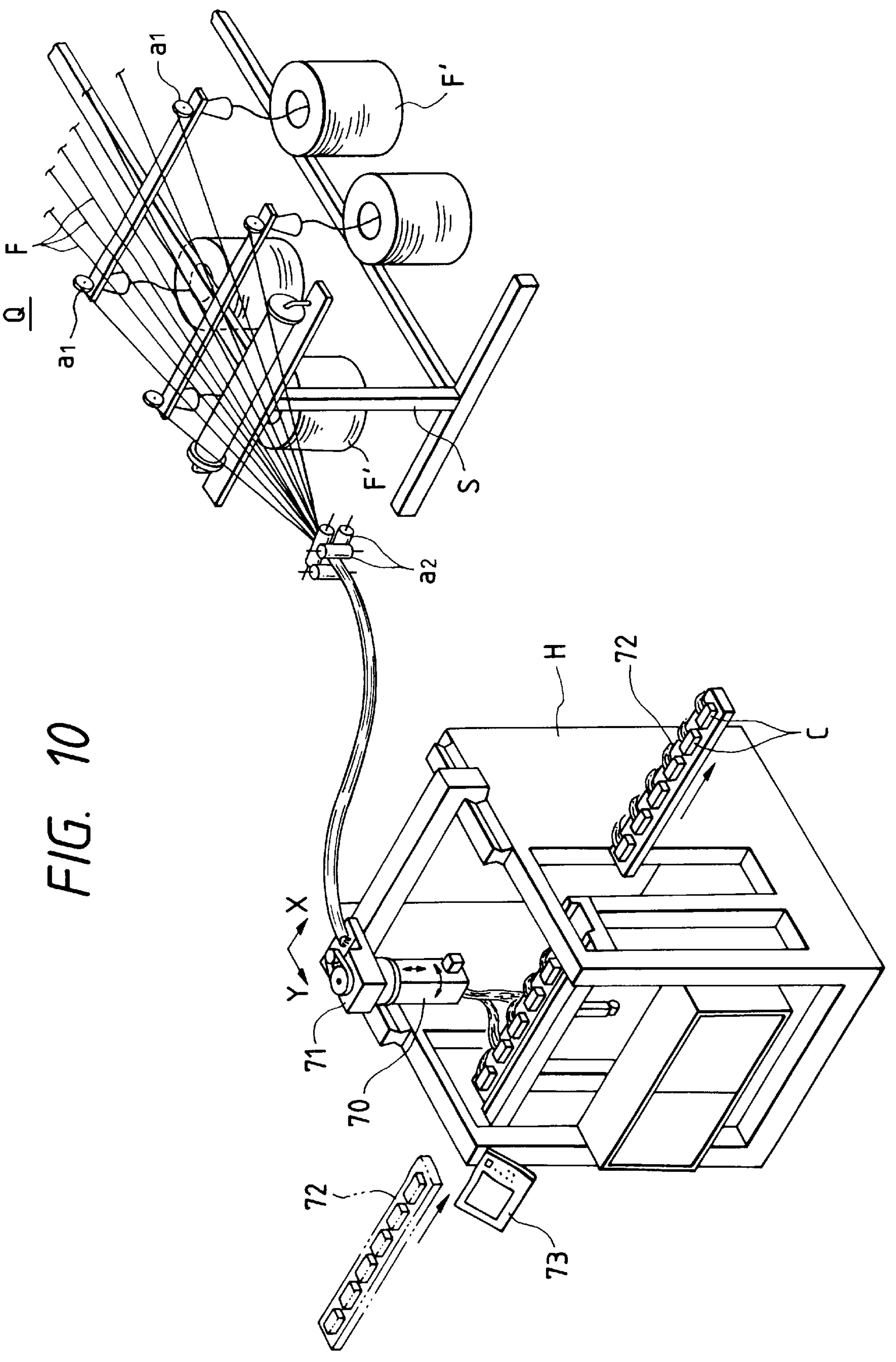
FIG. 10 is a perspective view showing an outline of an embodiment of the manufacturing apparatus of the present invention.
Figure 11:
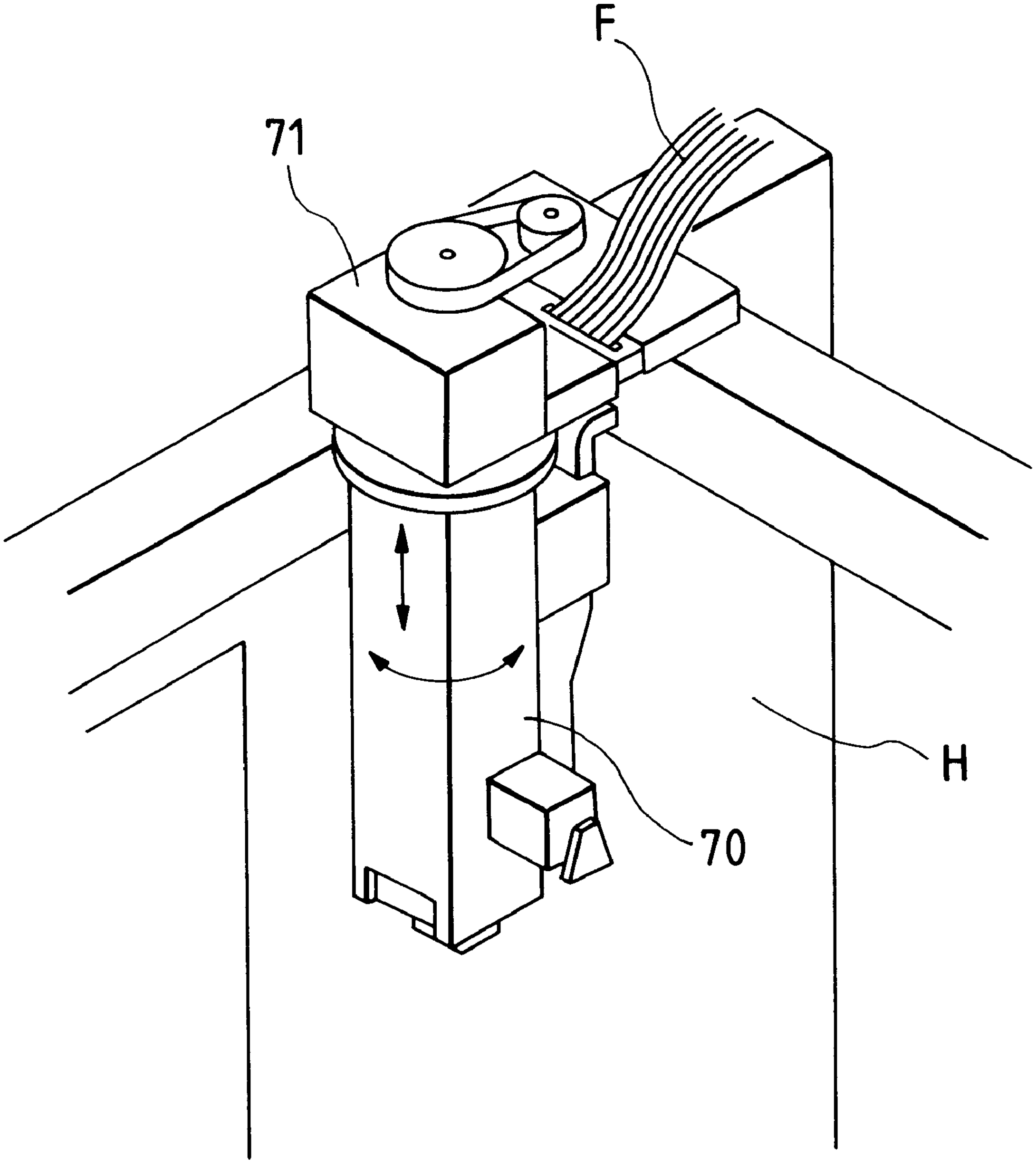
FIG. 11 is an enlarged view showing a primary portion of the manufacturing apparatus of the present invention.

FIGS. 10 to 12 are views showing an another embodiment of the apparatus of manufacturing a wire harness for automobile use. In these views, like reference characters are used to indicate like parts. Therefore, the explanations are omitted here.

In this embodiment, the pressure-connecting and wiring machine 70 is attached to the machine frame H in such a manner that it can be freely moved in the directions of the axes of X and Y. Also, as shown by the arrows in FIGS. 10 and 11, the pressure-connecting and wiring machine 70 can be rotated round the central axis and moved upward and downward. When the pressure-connecting and wiring machine 70 is moved in the directions of the axes of X and Y, also when the pressure-connecting and wiring machine 70 is rotated round the central axis, and also when the pressure-connecting and wiring machine 70 is moved upward and downward, a drive mechanism incorporated into the block 71 to support the pressure-connecting and wiring machine 70 is operated according to the direction given by the operation panel 73. A predetermined number of connectors C are put on the pallets 72 and conveyed to the pressure-connecting position. After the completion of pressure-connection, the connectors C are sent out. This operation to convey the connectors C is conducted manually or automatically by a robot.

Figure 12A:
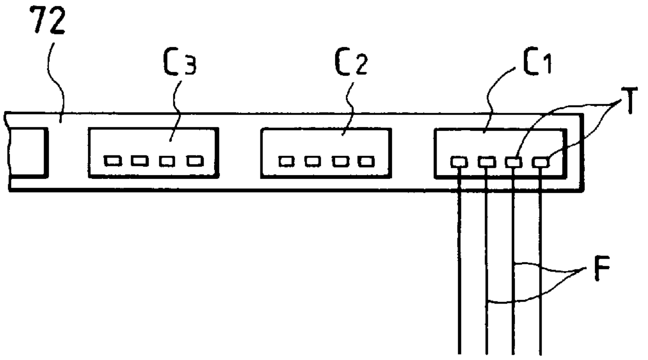
FIGS. 12A to 12E are schematic illustrations of the action of the embodiment.
Figure 12B:
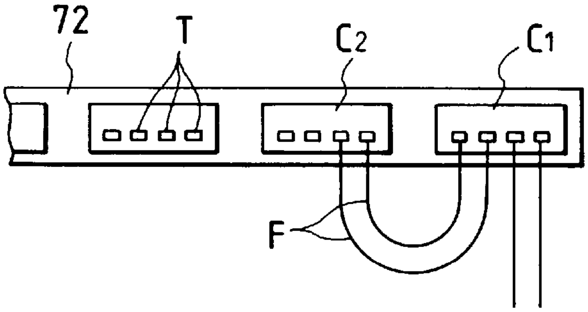

The wire harness W is manufactured in this embodiment as follows. For example, when the wire harness shown in FIG. 12E is manufactured, as shown in FIG. 12A, all necessary electrical wires F are simultaneously connected to the connector $C_1$ with pressure, and as shown in FIG. 12B, the electrical wires F to be maintained in parallel with each other are drawn out by a predetermined length, and then they are connected to another connector $C_2$ with pressure.

Figure 12C:
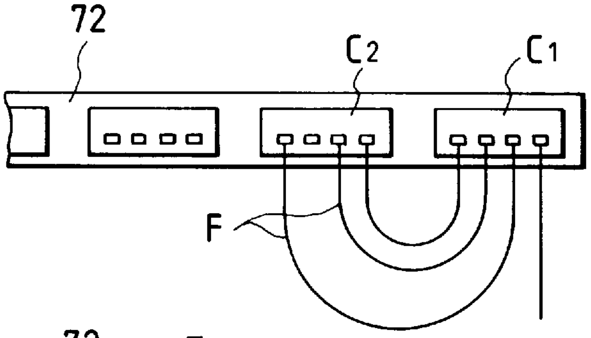
Figure 12D:
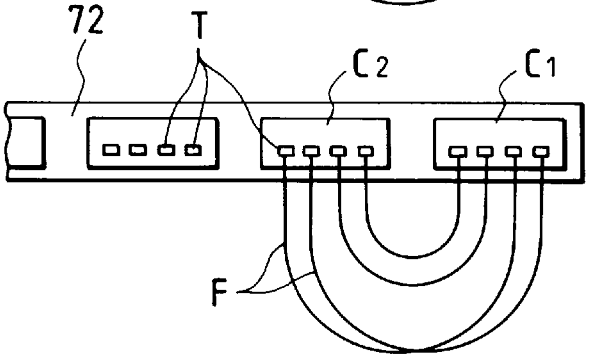
Figure 12E:
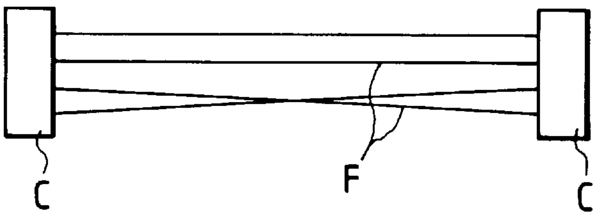

Successively, as shown in FIGS. 12C and 12D, the electrical wires F to cross each other are connected to the connector $C_2$ with pressure one by one. This pressure-connecting operation of the electrical wires F to cross each other will be described in detail later. After that, the electrical wires F are connected to the connectors $C_3$ . . . with pressure in the same manner.

<Embodiment of Pressure-Connecting and Wiring Machine>

FIGS. 13 to 21 are views showing an embodiment of the pressure-connecting and wiring machine 70, which is composed as follows. This pressure-connecting and wiring machine 70 includes: a pressure-connecting section 1 having a set A of a plurality of pressure-blades 2, . . . which can be operated individually and also having a set B of a plurality of pressure-blades 52, . . . ; and an electrical wire feed section 40 to feed the electrical wires F to positions close to each of the pressure-blades 2, 52. A selecting mechanism 50 to select the pressure-blade is incorporated into the above pressure-connecting section 1. The selecting mechanism 50 selects desired pressure-blades 2, 52 from the sets A, B of the pressure-blades 2, 52, and only the selected pressure-blades 2, 52 can be operated.

Figure 13:
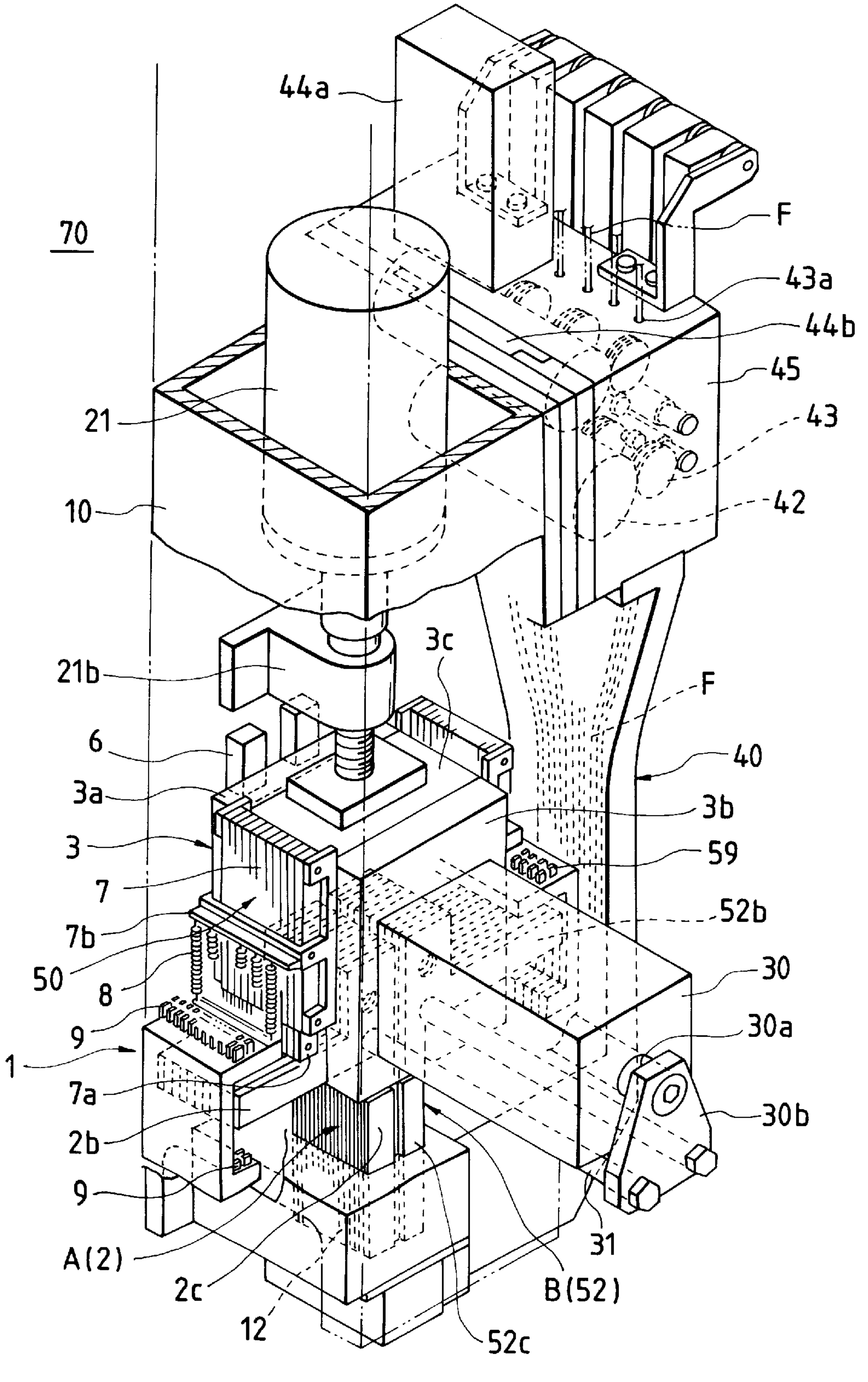
FIG. 13 is a perspective view of an embodiment of the pressure-connecting and wiring machine.

As shown in FIG. 13, the pressure-connecting section 1 includes the sets A, B of the plurality of pressure-blades 2, 52. In the pressure-connecting section 1, there is provided an elevating block 3 which elevates with respect to the pressure-terminals of the connector. This elevating block 3 is formed into a C-shaped rectangular frame by the two opposed side plates 3_a_, 3_b_ and the upper plate 3_c_. Between the two opposed side plates 3_a_, 3_b_, the sets A, B of the plurality of pressure-blades 2, 52 are arranged which will be described later.

Figure 14:
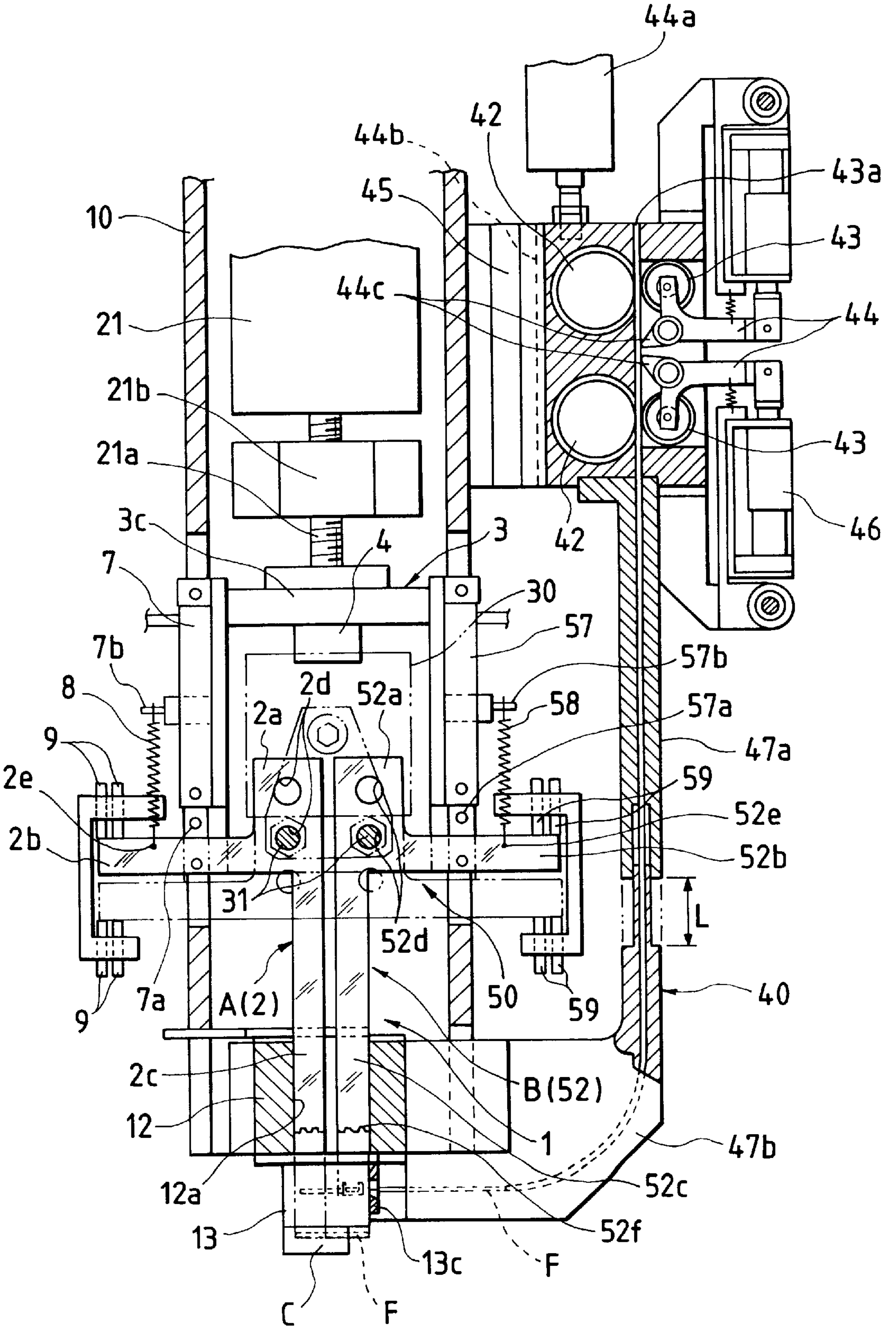
FIG. 14 is a cross-sectional front view of the primary portion of the pressure-connecting and wiring machine.
Figure 15:
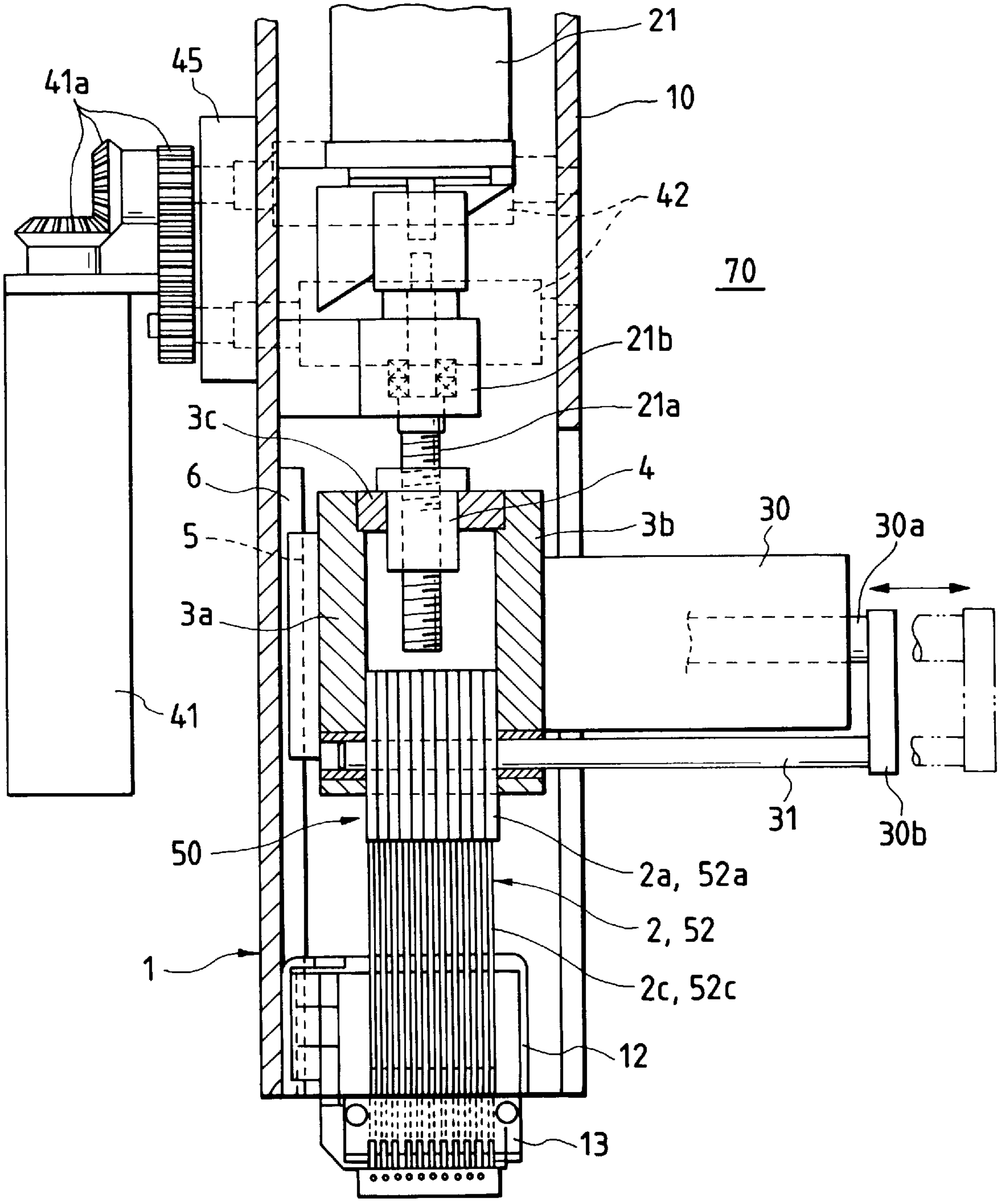
FIG. 15 is a cross-sectional side view of the primary portion of the pressure-connecting and wiring machine.

As illustrated in FIGS. 14 and 15, on the upper plate 3*c* of the elevating block 3, there is provided a ball nut 4. Into this ball nut 4, a rotational shaft 21*a* of the servo motor 21 attached to the upper portion of the frame 10 is screwed via a bearing 21*b*. Therefore, when the rotational shaft 21*a* is rotated, the elevating block 3 can be elevated. On the outer surface of one side plate 3*a* of the elevating block 3, there are provided two guide grooves 5, 5 which are arranged in the vertical direction. In the frame 10, there are provided two guide rails 6, 6 which engage with these grooves 5, 5. The elevating block 3 is elevated along these guide rails 6, 6.

Figure 16:
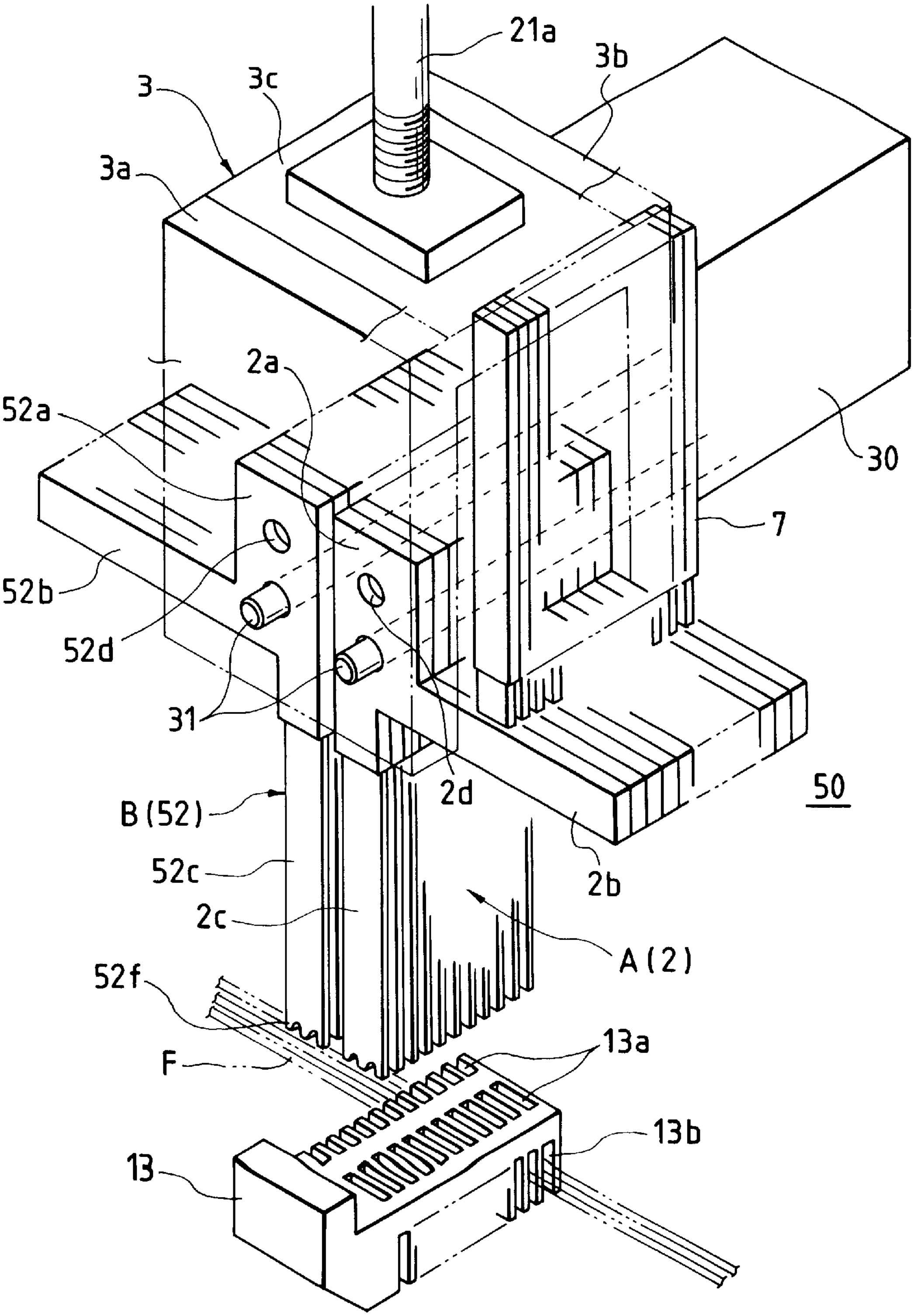
FIG. 16 is a perspective view showing a selecting mechanism of the pressure-blade of the pressure-connecting and wiring machine.
Figure 17:
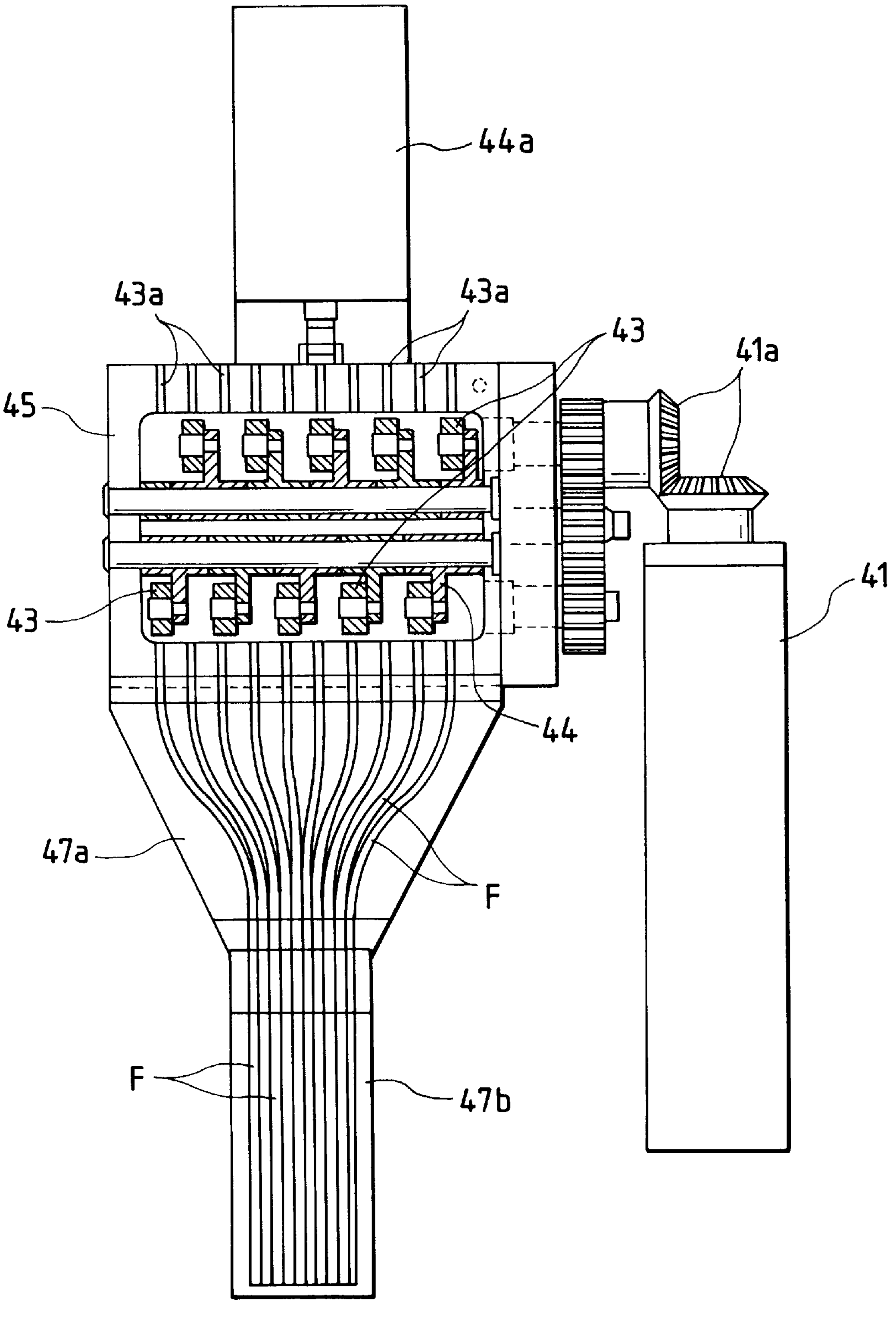
FIG. 17 is a rear view showing a primary portion of the electrical wire feed section of the pressure-connecting and wiring machine.

Next, the arrangement and action of the pressure-blades 2, 52 and the selecting mechanism 50 will be explained below. As shown in FIGS. 14 and 16, the pressure-blades 2, 52 are composed of plate-shaped bodies having L-shaped sections 2*a*, 52*a* and also composed of belt-shaped blade bodies 2*c*, 52*c* soldered to the L-shaped sections 2*a*, 52*a*. The thus formed pressure-blades 2, 52 are arranged between the side plates 3*a* and 3*b* of the elevating block 3 in such a manner that the surfaces of the pressure-blades 2, 52 are set in parallel with the surfaces of both side plates 3*a*, 3*b*, and the numbers of the pressure-blades 2, 52 are the same as those of the pressure-terminals of the connectors.

The L-shaped sections 2*a*, 52*a* of the pressure-blades 2, 52 are arranged along the surfaces of the side plates 3*a*, 3*b* symmetrically with respect to the transverse direction. In the vertical sections of the L-shaped section 2*a*, 52*a*, there are provided two insertion holes 2*d*, 52*d* for each vertical section, and the following selecting bars are inserted into these insertion holes 2*d*, 52*d*.

As illustrated in FIGS. 14 and 16, on the upper edge sides of the L-shaped horizontal sections 2*b*, 52*b* of the pressure-blades 2, 52, there are provided air cylinders 7, 57, and these air cylinders correspond to the pressure-blades by one-to-one. Reference numeral 57 is omitted in FIG. 16. In the middle sections of the air cylinders 7, 57, there are provided engaging protrusions 7*b*, 57*b*. Between these engaging protrusions 7*b*, 57*b* and the engaging holes 2*e*, 52*e* provided in the L-shaped horizontal sections 2*b*, 52*b*, there are provided springs 8, 58, so that the pressure-blades 2, 52 are pushed upward at all times. The L-shaped horizontal sections 2*b*, 52*b* are pushed downward by the rods 7*a*, 57*a* of the cylinders 7, 57 against the spring forces, so that the pressure-blades 2, 52 can be positioned at specific vertical positions.

On the outer surface of the side plate 3*b* of the elevating block 3, as illustrated in FIGS. 15 and 16, there is provided an air cylinder 30 which is attached perpendicular to the side plate 3*b*. At the end of the rod 30*a* of the air cylinder 30, there are provided two selecting bars 31, –31, and also there are provided a plate-shaped selecting bar holder 30*b* attached perpendicular to the plate surface.

The selecting bars 31 function as follows. The L-shaped horizontal sections 2*b*, 52*b* of the desired pressure-blades 2, 52 in the sets A and B of the pressure-blades 2, 52 are pushed downward by the rods 7*a*, 57*a* of the cylinders 7, 57. After that, the pushed L-shaped horizontal sections 2*b*, 52*b* are fixed by the selecting bars 31. In this state, the thus pushed L-shaped horizontal sections 2*b*, 52*b* are protruded from the lower ends of the residual pressure-blades 2, 52.

In order to make the desired pressure-blades 2, 52 protrude from the lower ends of the residual pressure-blades 2, 52 and fix them in the state, the pressure-blades 2, 52 are pushed downward by the cylinders 7, 57 until the centers of the upper side holes of the insertion holes 2*d*, 52*d* in the L-shaped vertical sections coincide with the axial centers of the selecting bars 31. In the above state, the above cylinders 30 are operated, and the selecting bars 31 are inserted into the upper side insertion holes 2*d*, 52*d* (shown in FIG. 14).

In this connection, as illustrated in FIG. 14, in order to make certain the vertical positions of the pressure-blades 2, 52, there are provided electromagnetic sensors 9, 59 to detect the elevation of the pressure-blades 2, 52, on the vertical lines which pass through the end portions of the L-shaped horizontal sections 2*b*, 52*b* protruding from the side of the elevating block 3.

As described above, the desired pressure-blades 2, 5 are protruded from the lower ends of other pressure-blades 2, 52 and fixed in the state. When the pressure-blades in the above state are lowered by the elevating blocks 3, 3, only the protruding pressure-blades 2, 52 are inserted into the grooves of the pressure-terminals. Accordingly, only the electrical wires F fed to the positions of the pressure-blades 2, 52 are connected to the connectors with pressure (shown in FIG. 14).

As illustrated in FIGS. 13 to 15, the lower end portions of the belt-shaped blade bodies 2*c*, 52*c* are gently inserted into the guide holes 12*a* of the guide blocks 12. Therefore, as described later, when the pressure-blades 2, 52 are elevated by the elevating block 3, the side formed by a bundle (group) of the pressure-blades 2 of the set A and the side formed by a bundle (group) of the pressure blades 52 of the set B slide along the inner surface of the guide holes 12*a*, so that the pressure blades 2, 52 can be smoothly elevated. This guide block 12 is fixed to the frame 10 by bolts.

Further, as illustrated in FIG. 16, in order to correctly guide the pressure-blades 2, 52 to the grooves of the pressure-terminals of the connector when the elevating block 3 is lowered, in the pressure-connecting section 1, there is provided another guide block 13 at a position where the belt-shaped sections 2*c*, 52*c* of the pressure-blades 2, 52 protrude downward from the aforementioned guide block 12. The lower end portions of the belt-shaped sections 2*c*, 52*c* are engaged in the slits 13*a* formed in the guide block 13 in the vertical direction.

This guide bock 13 is fixed to the frame 10 by bolts. As illustrated in FIG. 16, in the guide bock 13, in addition to the slits 13*a* formed in the vertical direction, there are formed slits 13*b* which penetrate the guide bock 13 in the longitudinal direction. Into these slits 13*b* formed in the longitudinal direction, the electrical wires F are guided from the electric wire feed section 40. The pressure blades 2, 52 are inserted into the slits 13*a* formed in the vertical direction. The pressure blades 2, 52 push downward the electric wires F so that they can be connected with pressure. At this time, the slits 13*b* function as guides, so that the electric wires F can be guided to the connector. Accordingly, pressure-connection can be accomplished without causing the disconnection of the electric wires F from the pressure-blades 2, 52. In FIG. 16, the guide block 13 is clearly shown. Therefore, the guide block 12 arranged above the guide block 13 is not shown in the drawing.

A side end section of the belt-shaped section 52*c* of the pressure-blade 52 of the set B on the side of the electrical wire feed section 40 is a cutting blade 52*f* to cut the electrical wires F. The corresponding lower blade 13*c* is arranged in the guide block 13 (shown in FIGS. 14 and 16). The width of the lower blade 13*c* covers the entire length of the electrical wires F in the parallel direction. When the pressure-blade 52 is lowered, the electrical wires F are cut by the lower blade 13*c* in cooperation with the cutting blade 52*f*.

The shapes of the cutting blades 2, 52 and the arrangement and action of the selecting mechanism 50 are described above. In order for the selecting mechanism 50 to be operated properly, the following precondition is required.

When the selecting bar 31 is inserted into the lower insertion hole, which is one of the two insertion holes 2*d,* 52*d* formed in the L-shaped vertical sections of the pressure-blades 2, 52, that is, when the pressure-blades 2, 52 are located at the upper dead points, it is important that the lower dead points are located at the position of the elevating block 3 so that the pressure-blades 2, 52 can not be inserted into the grooves of the pressure terminals of the connector C even if the elevating black 3 is lowered.

Next, referring to FIGS. 13 to 15 and FIG. 17, the electrical wire feed section 40 will be explained below. The electrical wire feed section 40 includes: a pair of rotational rollers 42 (shown in FIG. 15) rotated by the motor 41 via the gears 41*a;* and feed rollers 43 coming into contact with the rollers 42 as illustrated in FIG. 14. The pair of rotational rollers 42 are rotated by the gears 41*a* in the same rotational direction at the same speed (shown in FIG. 15). The motor 41 and the rollers 42, 43 are mounted on the moving block 45. This moving block 45 is moved upward and downward along the guide 44*b* by the air cylinder 44*a* fixed to the frame 10.

The feed rollers 43 are arranged in the width direction (the transverse direction in FIG. 17) zigzag with respect to the vertical direction so that the adjacent rollers 43 can not interfere with each other. The electrical wires F are introduced from the guide hole 43*a* into between each feed roller 43 and rotational roller 42. When both rollers 42, 43 are rotated coming into pressure contact with each other via the electric wires F, the electric wires F can be fed downward.

As shown in FIG. 14, each feed roller 43 is attached to one end of the Y-shaped link 44, and the other end 44*c* of the Y-shaped link 44 is formed into a pressure piece. The base end of each link 44 is connected to the plunger of the air cylinder 46. When the plunger is advanced or retracted, it is possible to select one of the following two states. One is a state in which the feed roller 43 comes into contact with the rotational roller 42, and the other is a state in which the feed roller 43 is separated from the rotational roller 42, so that the pushing piece 44*c* can be contacted with the electrical wires F with pressure.

There is provided one electrical wire guide 47*a* on the lower surface of the moving block 45. After the electrical wires F have been fed by the rotational roller 42 and the feed roller 43, they pass through in this guide 47*a* and are introduced into the pressure-contacting section 1. There is provided the other electrical wire guide 47*b* at the lower portion on the front surface of the frame 10. Into this guide 47*b,* the guide 47*a* is introduced and guided into the pressure-connecting section 1. Connecting sections of both guides 47*a,* 47*b* are engaged with each other in such a manner that they can appear and disappear freely.

As shown in FIG. 14, the electrical wires F are pushed downward and connected to the pressure-terminal of the connector with pressure as follows. Under the condition that the electrical wires F are pushed by the pushing piece 44*c,* the air cylinder 44*a* of the electrical wire feed section 40 is extended, so that the block 45 can be lowered by the length L. In accordance with the length L, the electrical wires F protrude from the lower blade 13*c* and enter the slit 13*b* of the guide block 13. When the pressure-blade 2 is lowered under the above condition, the electrical wires F are pushed downward and connected to the pressure-terminal of the connector with pressure.

The arrangement and action of the pressure-connecting section, the electrical wire feed section and the selecting mechanism of the pressure-blade of this embodiment are described above. Next, a process of manufacturing a wire harness of cross-wiring will be explained below. In this manufacturing process, the pressure-connecting and wiring machine 70 is moved by the aforementioned moving mechanism such as robot P.

Figure 25A:
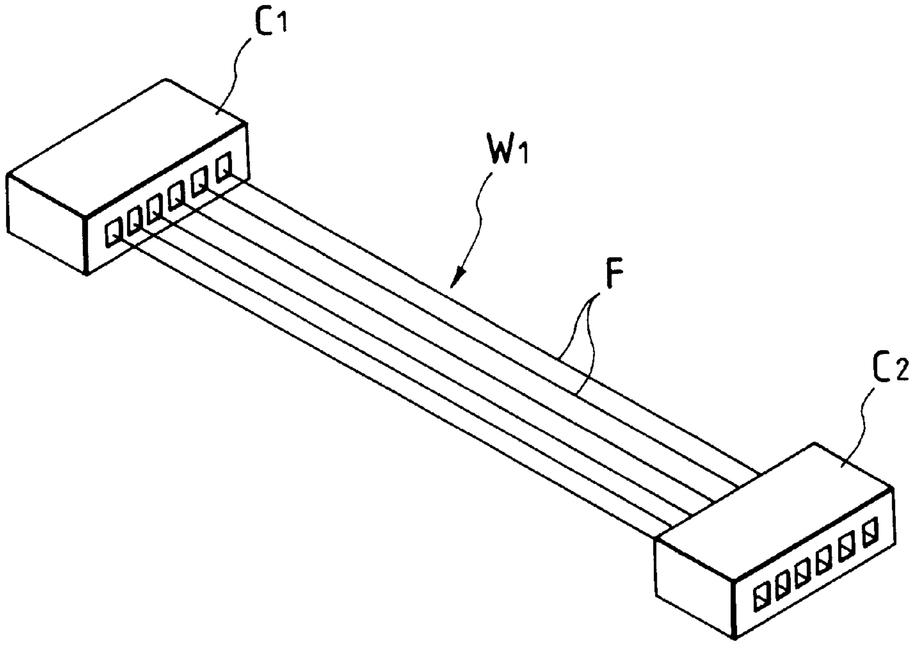
FIGS. 25A and 25B are wiring diagrams of an example of the wire harness.
Figure 25B:
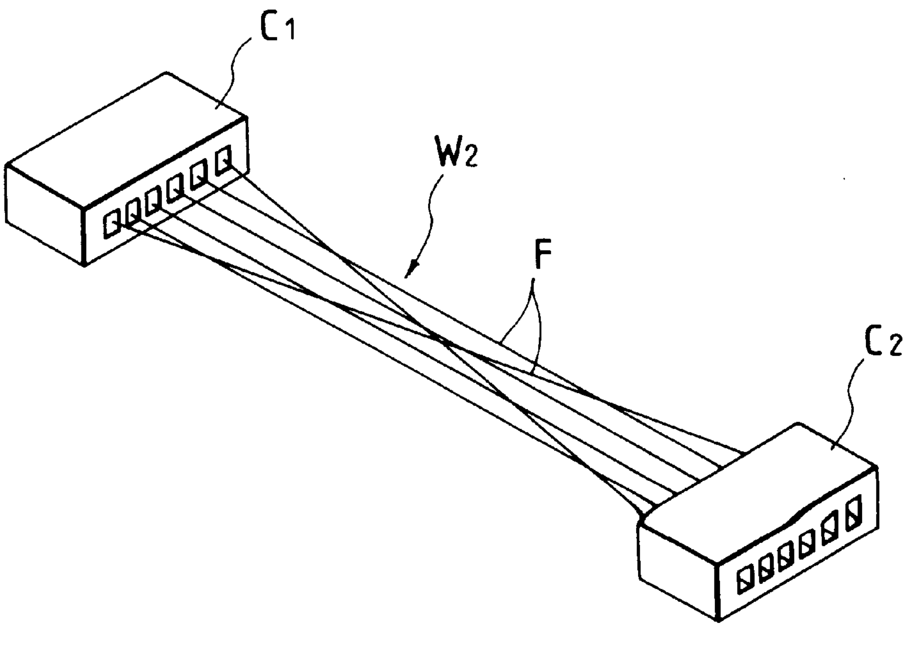
Figure 26A:
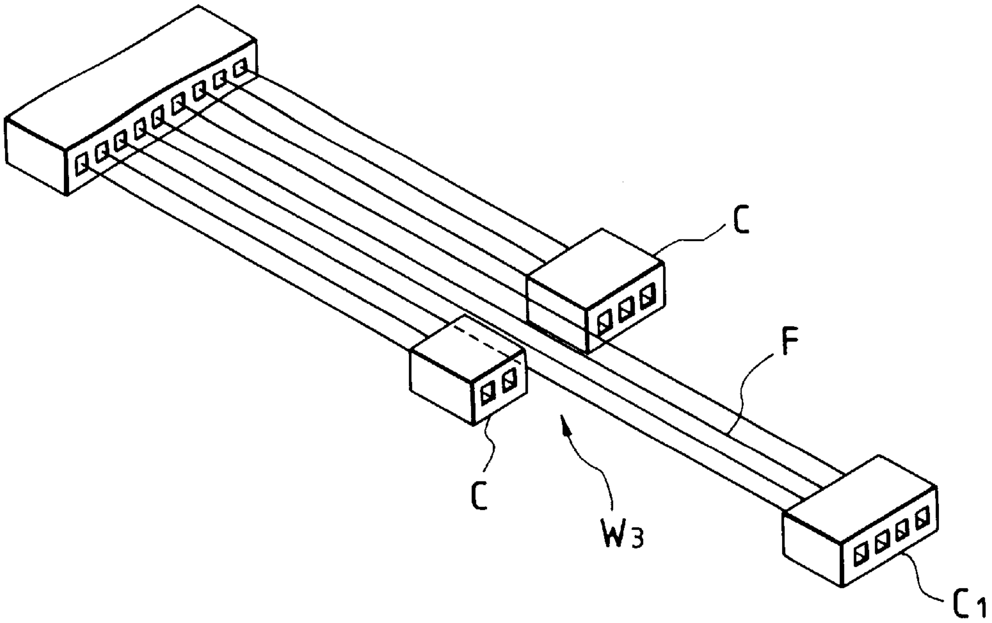
FIGS. 26A and 26B are wiring diagrams of an example of the wire harness.
Figure 26B:
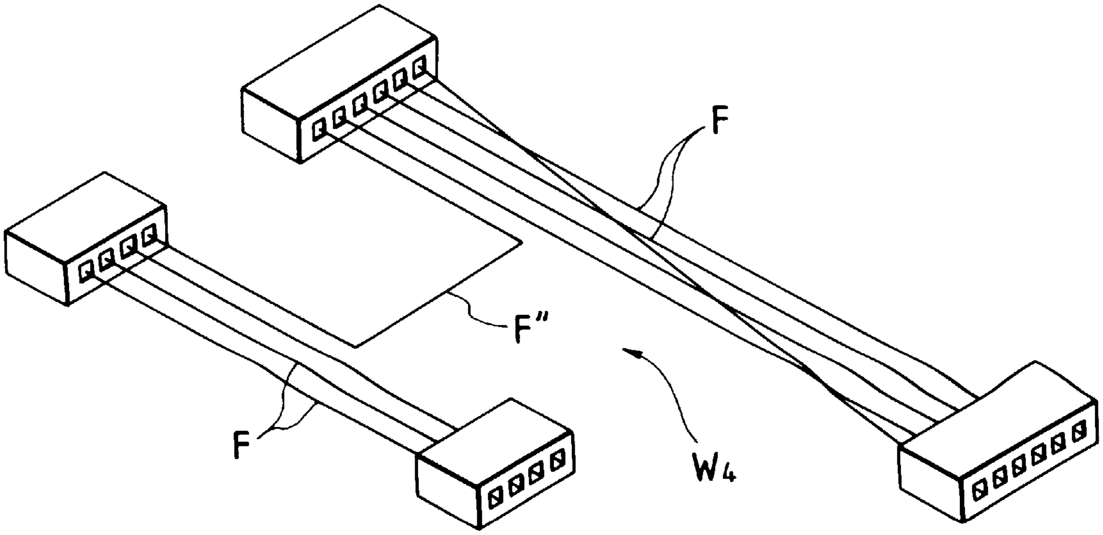
Figure 27A:
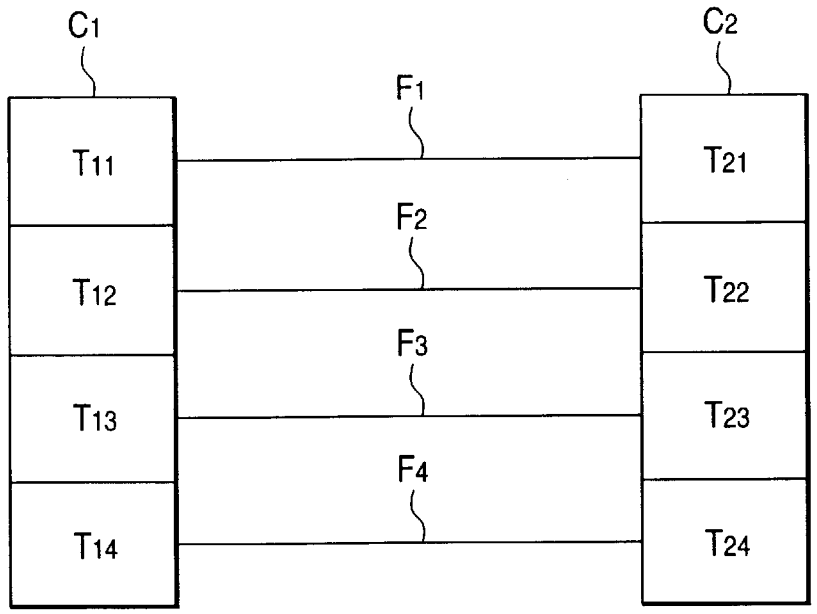
FIGS. 27A and 27B are wiring diagrams showing a model of an example of the wire harness.
Figure 27B:
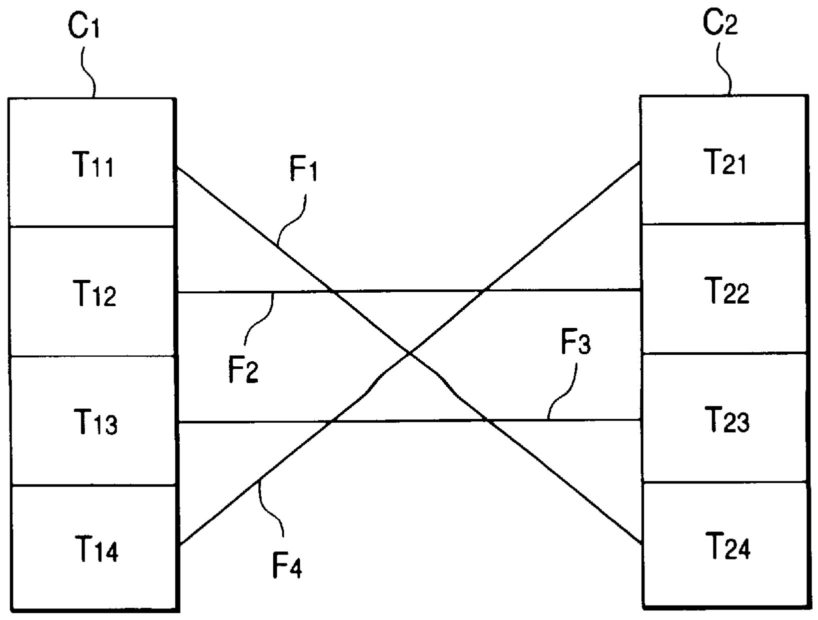
Figure 28A:
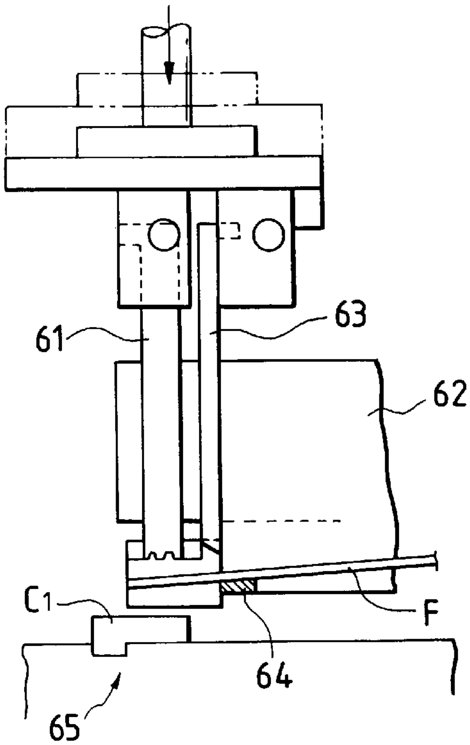
FIGS. 28A to 28D are views showing a model of the pressure-connecting process conducted by the conventional pressure-connecting machine.
Figure 28B:
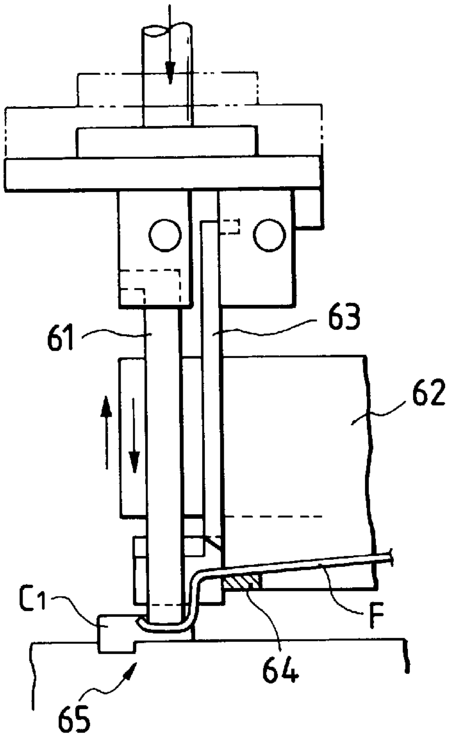
Figure 28C:
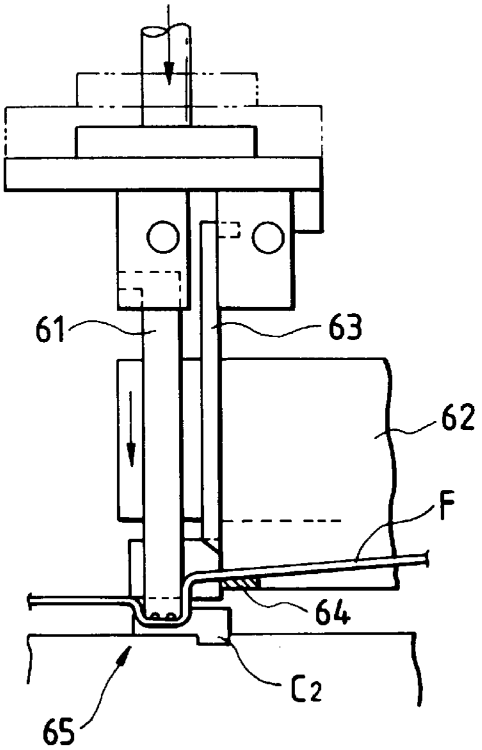
Figure 28D:
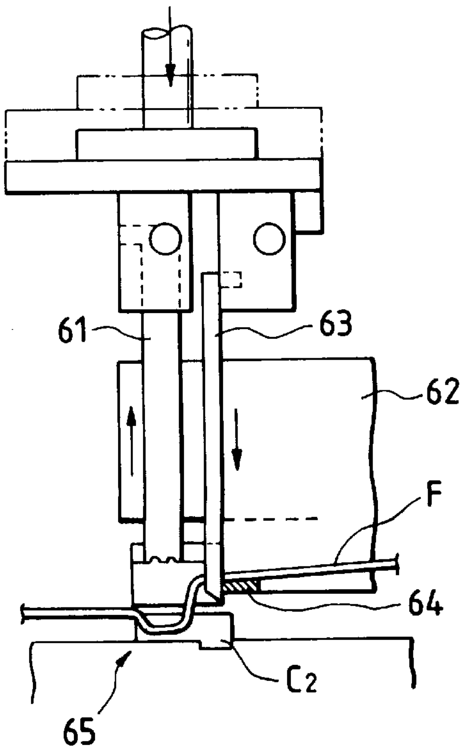

In this case, the objective wire harness of cross-wiring is shown in FIG. 25B or FIG. 27B. That is, the connector $C_1$ having four pressure-terminals $T_{11}$, $T_{12}$, $T_{13}$ and $T_{14}$ is connected to the connector $C_2$ having four pressure-terminals $T_{21}$, $T_{22}$, $T_{23}$ and $T_{24}$ by the electrical wires $F_1$, $F_2$, $F_3$ and $F_4$.

Since the number of the pressure-terminals is four, the number of the pressure-blades 2 of the set A to be used is also four, and the number of the pressure-blades 52 of the set B to be used is also four. In the following explanations, the pressure-blades 2 of the set A are represented by reference numerals $\mathbf{2}_1$, $\mathbf{2}_2$, $\mathbf{2}_3$ and $\mathbf{2}_4$, and the pressure-blades 52 of the set B are represented by reference numerals $\mathbf{52}_1$, $\mathbf{52}_2$, $\mathbf{52}_3$ and $\mathbf{52}_4$.

FIG. 18 is a view showing a primary portion in detail where pressure-connection is conducted. In FIGS. 20 and 21, in order to clearly show a positional relations between the pressure-blades $\mathbf{2}_1$, $\mathbf{2}_2$, $\mathbf{2}_3$, $\mathbf{2}_4$, $\mathbf{52}_1$, $\mathbf{52}_2$, $\mathbf{52}_3$ and $\mathbf{52}_4$ and the pressure terminals $T_{11}$, $T_{12}$, $T_{13}$, $T_{14}$, $T_{21}$, $T_{22}$, $T_{23}$ and $T_{24}$, the pressure-blades $\mathbf{2}_1$, $\mathbf{2}_2$, $\mathbf{2}_3$, $\mathbf{2}_4$, $\mathbf{52}_1$, $\mathbf{52}_2$, $\mathbf{52}_3$ and $\mathbf{52}_4$ of the pressure-connecting and wiring machine 70 are located in cubes and illustrated schematically.

In this embodiment, the wire harness is manufactured as follows. The electrical wires F are previously fed to the pressure-connecting section 1 from the electrical wire feed section 40. Under the condition that the pushing piece 44*c* of the link 44 pushes each electrical wire F, all pressure-blades 52 on the side, on which the cutting blades 52*f* are formed, are selected by the selecting mechanism 50, and the elevating block 3 is lowered to cut the electrical wires F. In this way, the end portions of the electrical wires F are put in order. The connectors $C_1$ and $C_2$ are set at predetermined positions manually or automatically by an automatic machine.

Next, the pressure-connecting and wiring machine 70 is moved to a position at which the pressure-blades 2 of the set A face the pressure-terminals T of one $C_1$ of the connectors. While the pressure-connecting and wiring machine 70 is being moved, or immediately after the pressure-connecting and wiring machine 70 has been moved, all pressure-blades 2 of the set A are selected by the selecting mechanism of the pressure-blades 2, 52. The selected pressure-blades $\mathbf{2}_1$, $\mathbf{2}_2$, $\mathbf{2}_3$ and $\mathbf{2}_4$ are surrounded by the bold black frames in FIG. 20A.

Figure 18B:
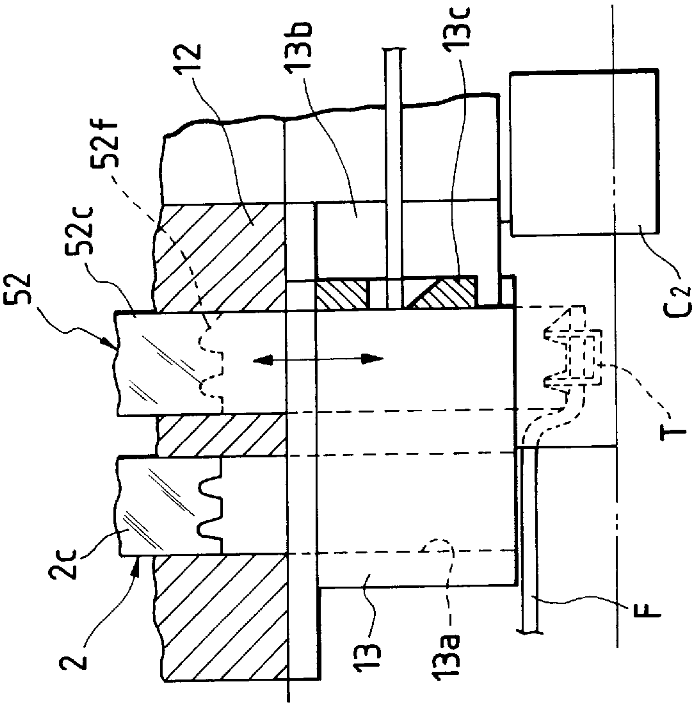
FIGS. 18A and 18B are views showing the detail of the primary portion of the pressure-connecting section of the connector of the embodiment.
Figure 18A:
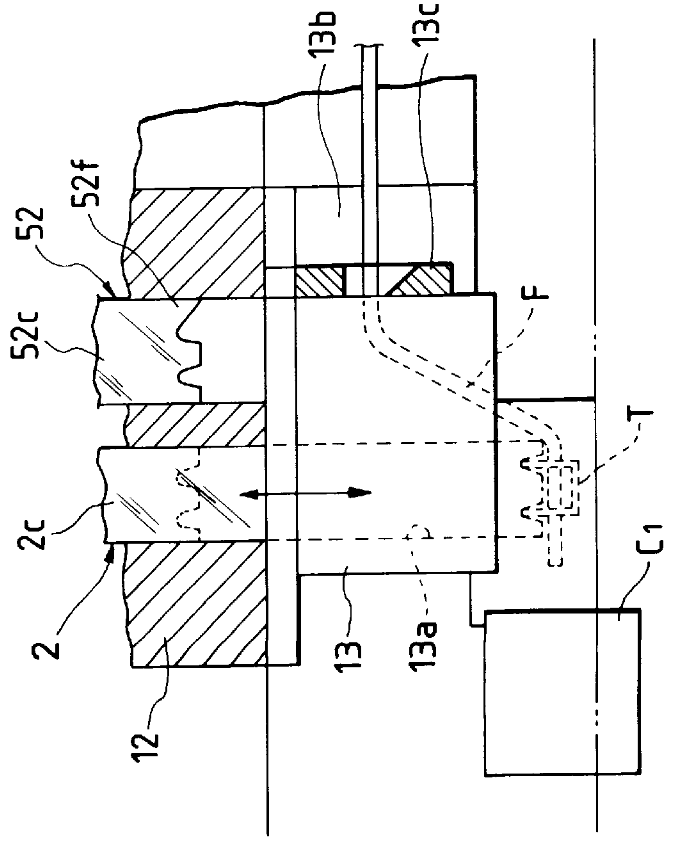
Figure 20A:
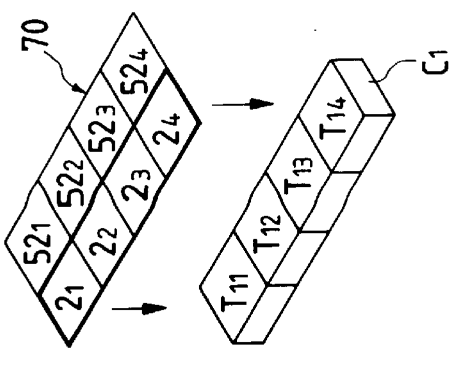
FIG. 20A to 20D are views showing a model of the pressure-connecting process of the embodiment.

To the respective pressure-terminals $T_{11}$, $T_{12}$, $T_{13}$ and $T_{14}$, the electrical wire $F_1$, $F_2$, $F_3$ and $F_4$ are fed from the electrical wire feed section 40. As shown in FIG. 20A, end portions of these electrical wires are connected with pressure all at once by all pressure-blades $\mathbf{2}_1$, $\mathbf{2}_2$, $\mathbf{2}_3$ and $\mathbf{2}_4$ of the selected set A. After the completion of pressure-connection, the cover is attached. The detail of the pressure-connecting section in the pressure-connection is shown in FIG. 18A. As shown in the drawing, even when the elevating block 3 is lowered, the pressure-blade 52 having the cutting blade 52*f* remains at an upper position, and only the pressure-blade 2 having no cutting blade 52*f* connects the electric wire F to the pressure-terminal T of the connector $C_1$ with pressure.

Figure 20B:
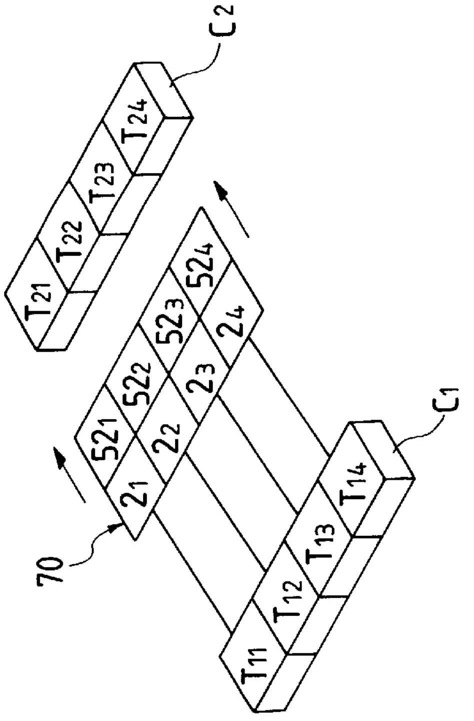

Next, the pressure-connecting and wiring machine 70 is moved upward from the connector $C_1$, and as illustrated in FIG. 20B, it is moved horizontally so that the pressure-blades 52 of the set B can be located at pressure-connecting positions of the other connector $C_2$. In this movement, in order to feed the electrical wires F smoothly for wiring, the feed roller 43 of the electrical wire feed section 40 is appropriately pressed against the electrical wires F.

Figure 20C:
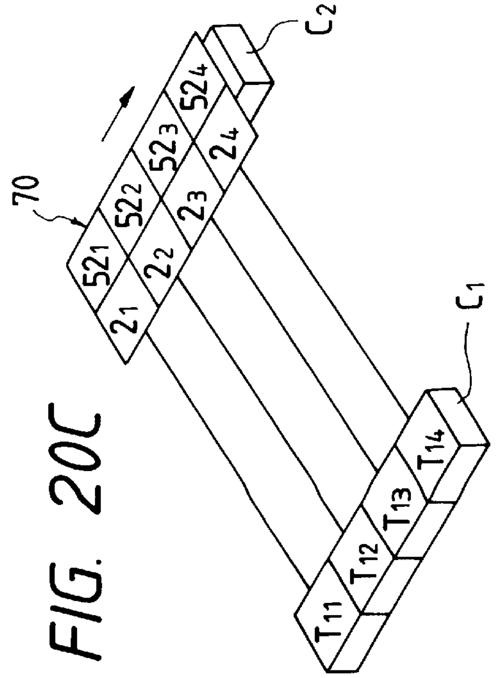

Next, in order to connect the electrical wire $F_1$, which is located at the position of the blade $52_1$ in the pressure-blades 52, to the pressure-terminal $T_{24}$ of the connector $C_2$ with pressure, as shown in FIG. 20C, the pressure-connecting and wiring machine 70 is moved in the direction of the arrangement of the pressure terminals T (the direction of the arrow in the drawing). After the pressure-connecting and wiring machine 70 has been moved, or alternatively while the pressure-connecting and wiring machine 70 is being moved, the selecting mechanism is operated, and only the blade $52_1$ is selected from the pressure-blades 52. In this case, the selected pressure-blade $52_1$ is surrounded by a bold black frame in FIG. 20D. Under the condition that all pressure-blades 2 of the set A and the residual blades $52_2$, $52_3$, $52_4$ of the pressure-blades 52 of the set B are retracted, they are fixed. In order to fix the pressure-blades, the selecting bars 31 of the cylinder 30 are inserted into the insertion holes 2*d,* 52*d* of the L-shaped vertical sections of the pressure blades.

Figure 20D:
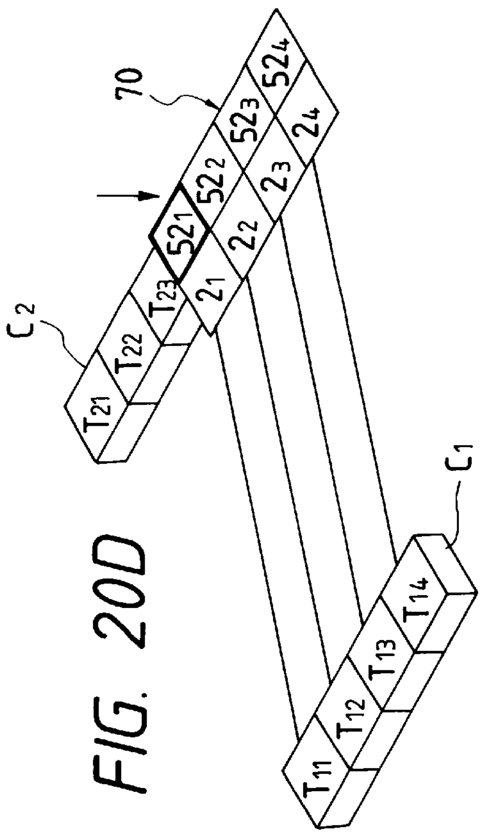

Successively, as shown in FIG. 20D, the pressure-connecting and wiring machine 70 is lowered, and the electrical wire $F_1$ is inserted into and connected to the pressure-terminal $T_{24}$ of the connector $C_2$ with pressure. At the same time, the electrical wire $F_1$ is cut by the cutting blade 52*f* attached to the pressure-blade $52_1$. The detail of the pressure-connecting section in the pressure-connection is shown in FIG. 18B. As shown in the drawing, even when the elevating block 3 is lowered, the pressure-blade 2 having no cutting blade 52*f* remains at an upper position, and only the pressure-blade $52_1$ having the cutting blade 52*f* connects the electric wire $F_1$ to the pressure-terminal $T_{24}$ of the connector $C_2$ with pressure. At this stage described above, cross-wiring of the electrical wire $F_1$ is completed.

Figure 19B:
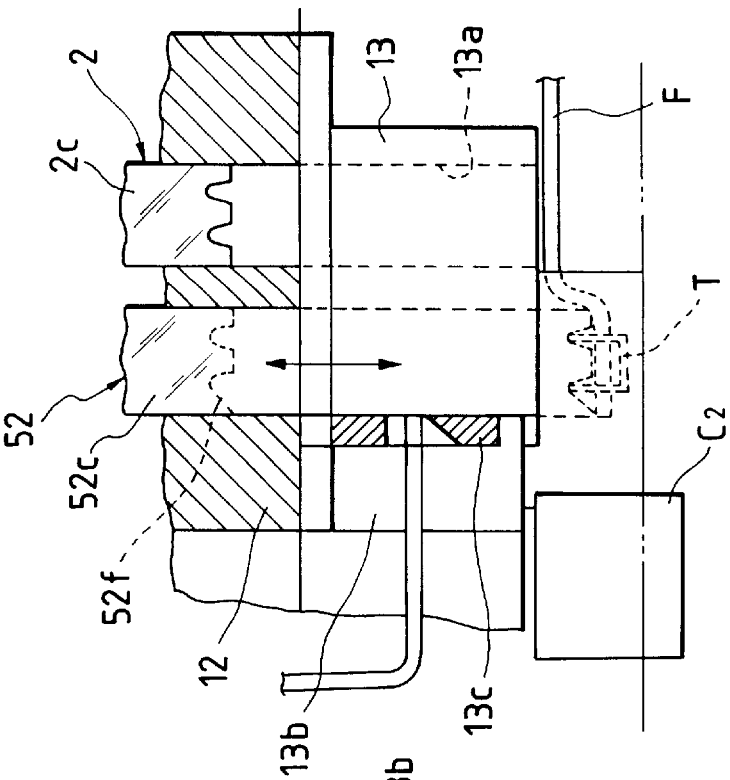
FIGS. 19A and 19B are views showing the detail of the primary portion of the pressure-connecting section of the connector of the embodiment.
Figure 19A:
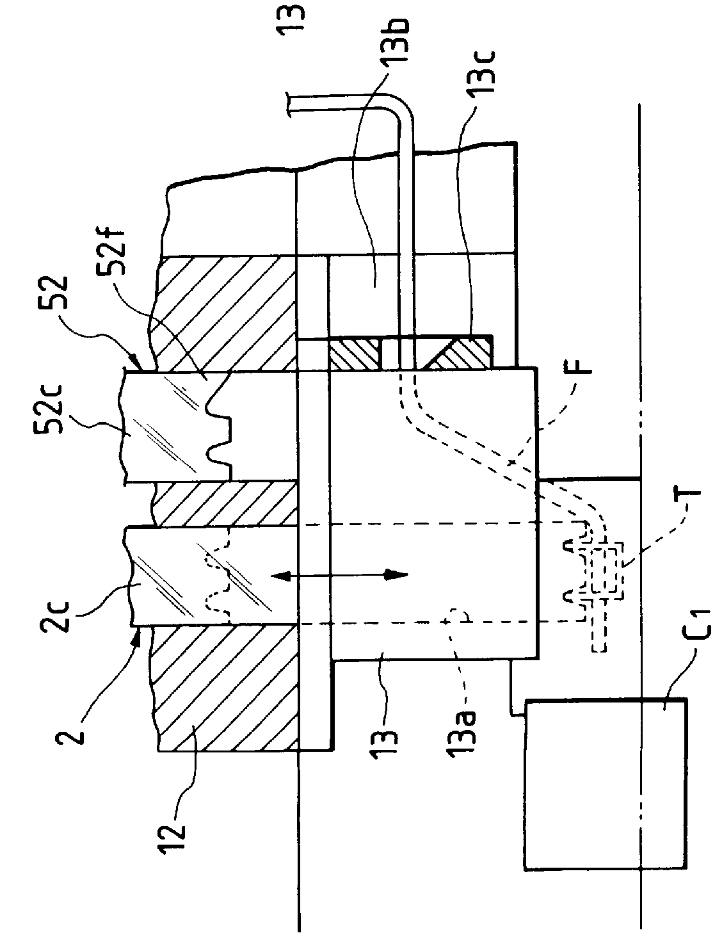

In this connection, according to the manufacturing method shown in FIG. 12, when the pressure-connection is conducted on the connector $C_2$, the direction of the pressure-connecting and wiring machine 70 is opposite to the direction of the connector $C_1$. Accordingly, the pressure-connecting and wiring machine 70 is rotated by the angle of 180°. Therefore, the actions of the pressure-blades 2, 52, for the connector $C_1$ are shown in FIG. 19A, and the actions of the pressure-blades 2, 52, for the connector $C_2$ are shown in FIG. 19B.

Next, the pressure-connecting and wiring machine 70 is raised and separated from the pressure-terminal T of the connector $C_2$. While the pressure-connecting and wiring machine 70 is being raised, or immediately after the pressure-connecting and wiring machine 70 has been raised, the selecting mechanism 50 is operated, so that only the pressure-blades $52_2$, $52_3$ of the pressure-blades 52 in the set B are selected. Under the condition that all pressure-blades 2 of the set A and the residual blades $52_1$, $52_4$ of the pressure-blades 52 of the set B are retracted upward, they are fixed. Then, the pressure-connecting and wiring machine 70 is moved in the direction of the arrangement of the pressure-terminals T (the direction of the arrow in the drawing) so that the pressure-blades $52_2$, $52_3$ can be respectively located in the grooves of the pressure-terminals $T_{22}$, $T_{23}$ of the connector $C_2$ (shown in FIG. 21A).

Figures 21A, 21B, 21C, 21D:
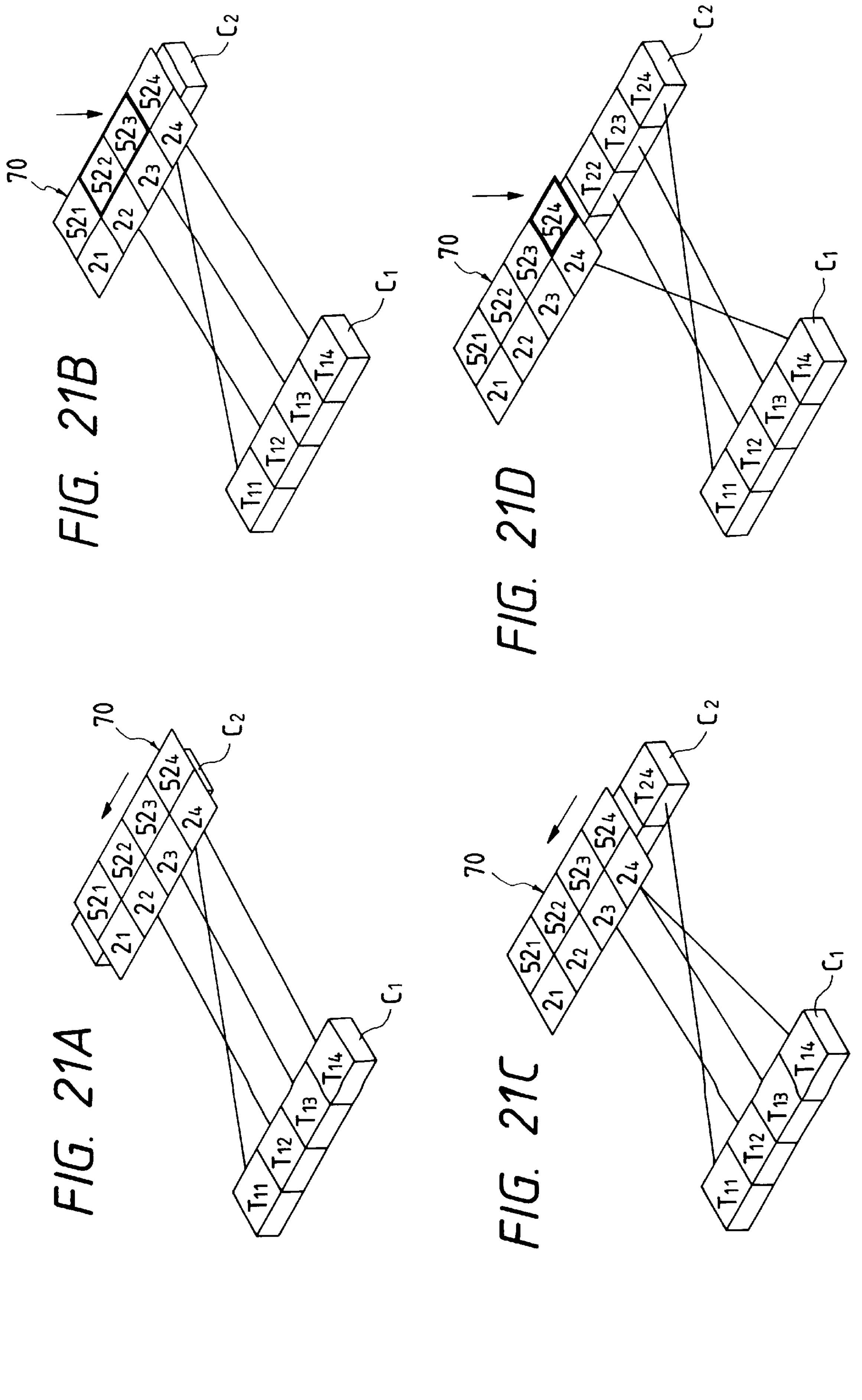
FIG. 21A to 21D are views showing a model of the pressure-connecting process of the embodiment.

Successively, the pressure-connecting and wiring machine 70 is lowered, and the electrical wires $F_2$ and $F_3$ are inserted into and connected to the grooves of the pressure terminals $T_{22}$, $T_{23}$ with pressure (shown in FIG. 21B). At the same time, the electrical wire $F_2$ and $F_3$ are cut by the cutting blades 52*f* attached to the pressure-blades $52_2$, $52_3$. The detail of the pressure-connecting acting section at this time is the same as that shown in FIGS. 18 and 19.

In the same manner as described above, when the pressure-terminal $T_{14}$ is connected to the pressure-terminal $T_{21}$ by the electrical wire $F_4$, the pressure-connecting blade $52_4$ is selected from the pressure-blades 52 of the set B, and the pressure-connecting and wiring machine 70 is moved horizontally in the direction of the arrangement of the pressure-terminals $T_2$ (the direction of the arrow shown in FIG. 21C). When the pressure-blade $52_4$ comes to a position immediately above the terminal $T_{21}$, the elevating block 3 is lowered, so that the pressure-connection can be accomplished (shown in FIG. 21D).

As described above, in the pressure-connecting apparatus of this embodiment, the desired pressure-blades 2, 52 are selected from the plurality of pressure-blades 2, 52 by the selecting mechanism 50, and pressure-connection is conducted only by the selected pressure-blades 2, 52. Therefore, when the wire harness of cross-wiring is manufactured, the wiring motions can be remarkably omitted as follows. First, the electrical wires F are connected to one connector $C_1$ with pressure all at once. Then, when the wiring motion (horizontal movement), in which the pressure-connecting and wiring machine 70 is moved to the other connector C2, is conducted only once, the pressure-connection of the connector $C_2$ can be accomplished only by moving the pressure-connecting and wiring machine 70 in the direction of the arrangement of the pressure-terminals of the connector $C_2$. Compared with the conventional case in which the pressure-connecting and wiring machine 70 is returned to the side of one connector $C_1$ each time, the wiring motions can be remarkably omitted.

In the above embodiment, the wire harness of cross-wiring is manufactured. However, it should be noted that the wire harness, in which the electrical wire lengths are different from each other, or the wire harness including "a crossover wiring F" can be manufactured when the pressure-blades 2, 52 are appropriately acted. Also, it should be noted that the wire harness of parallel wiring can be connected with pressure all at once when all pressure-blades 2, 52 are selected by the above selecting mechanism and the thus selected pressure-blades are fixed.

<Another Embodiment of Pressure-Connecting and Wiring Machine>

Figure 22:
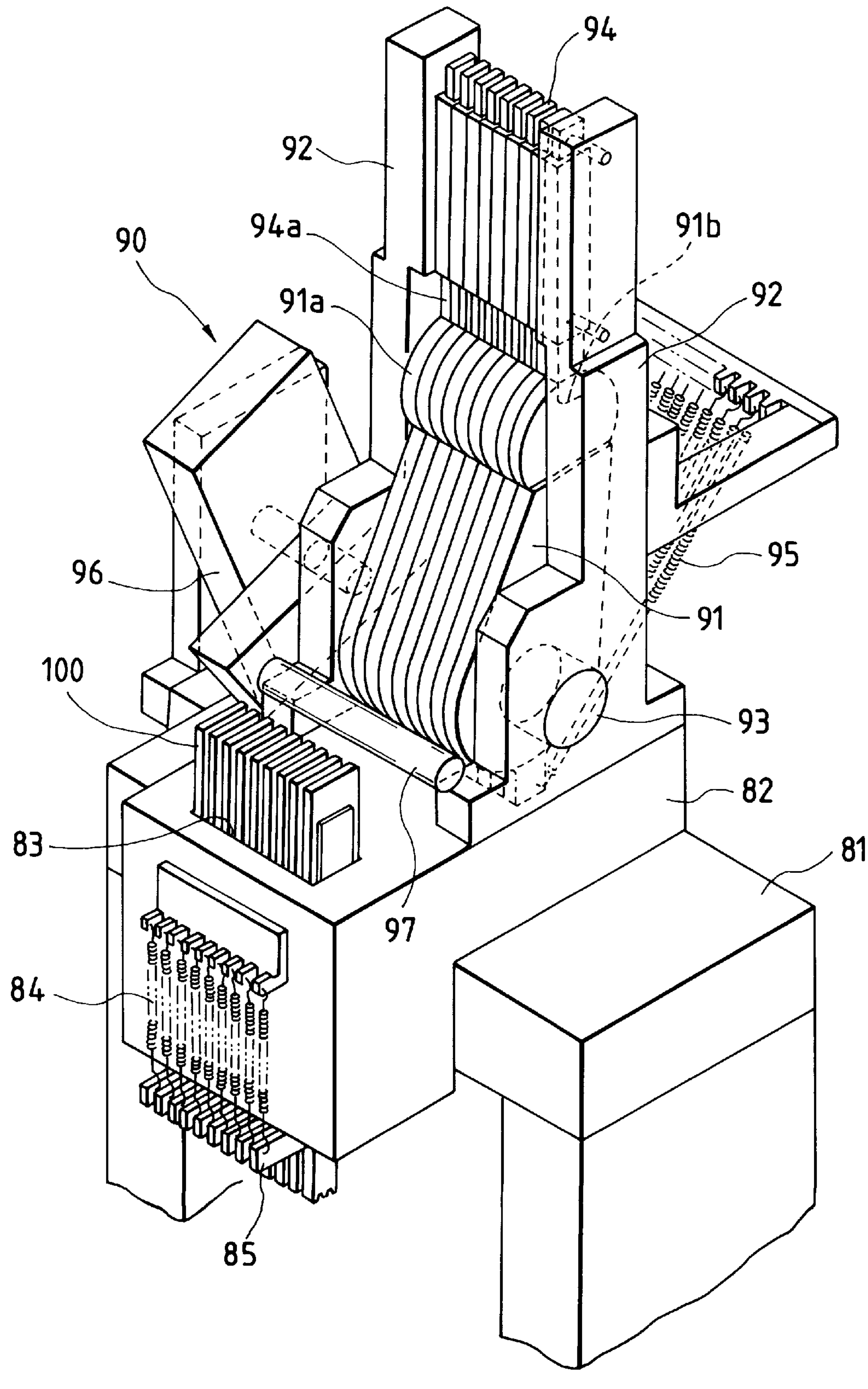
FIG. 22 is a perspective view showing a selecting mechanism for selecting the pressure-blades of another embodiment of the pressure-connecting and wiring machine.
Figure 23:
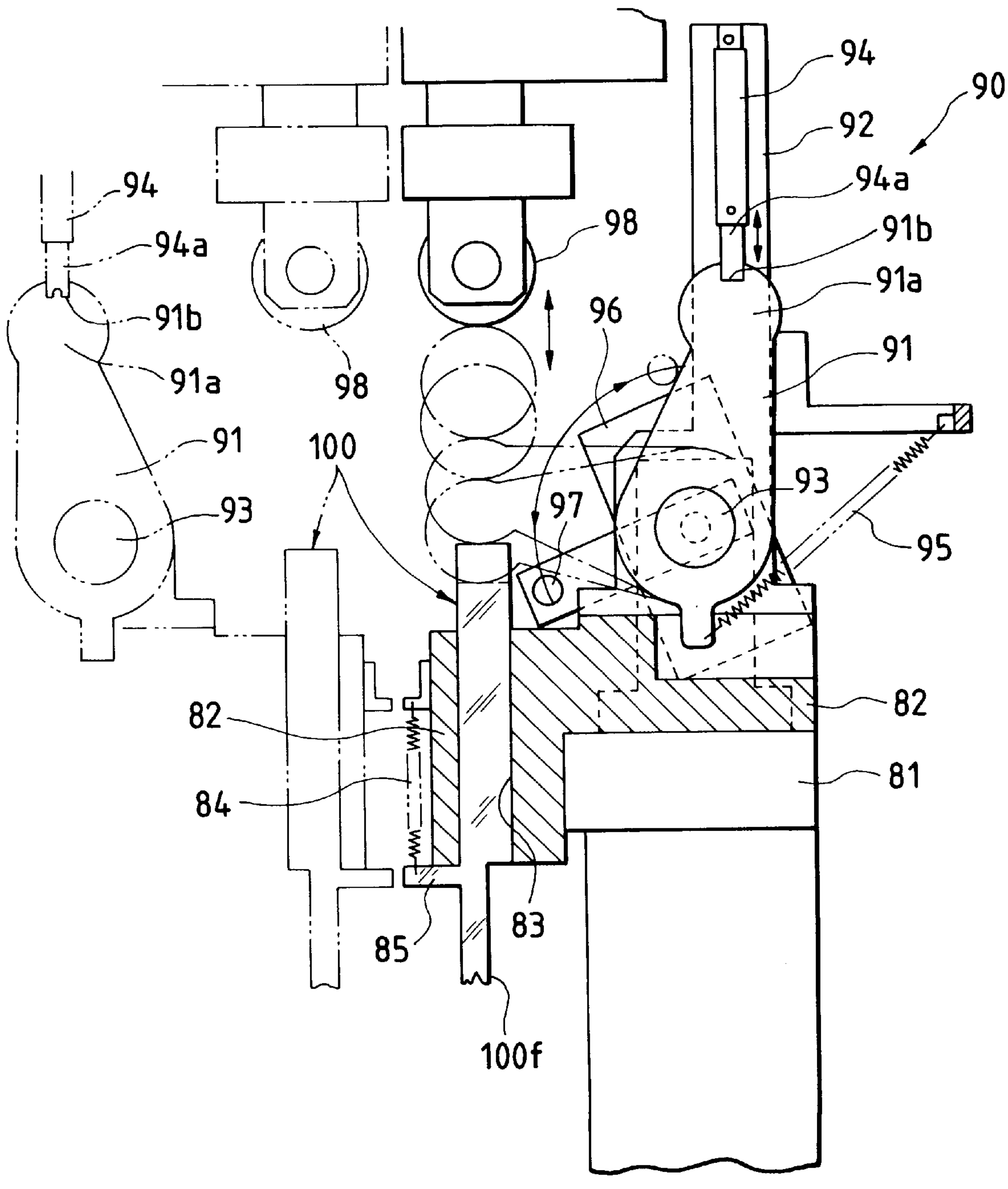
FIG. 23 is a cross-sectional front view of the primary portion of FIG. 22.
Figure 24:
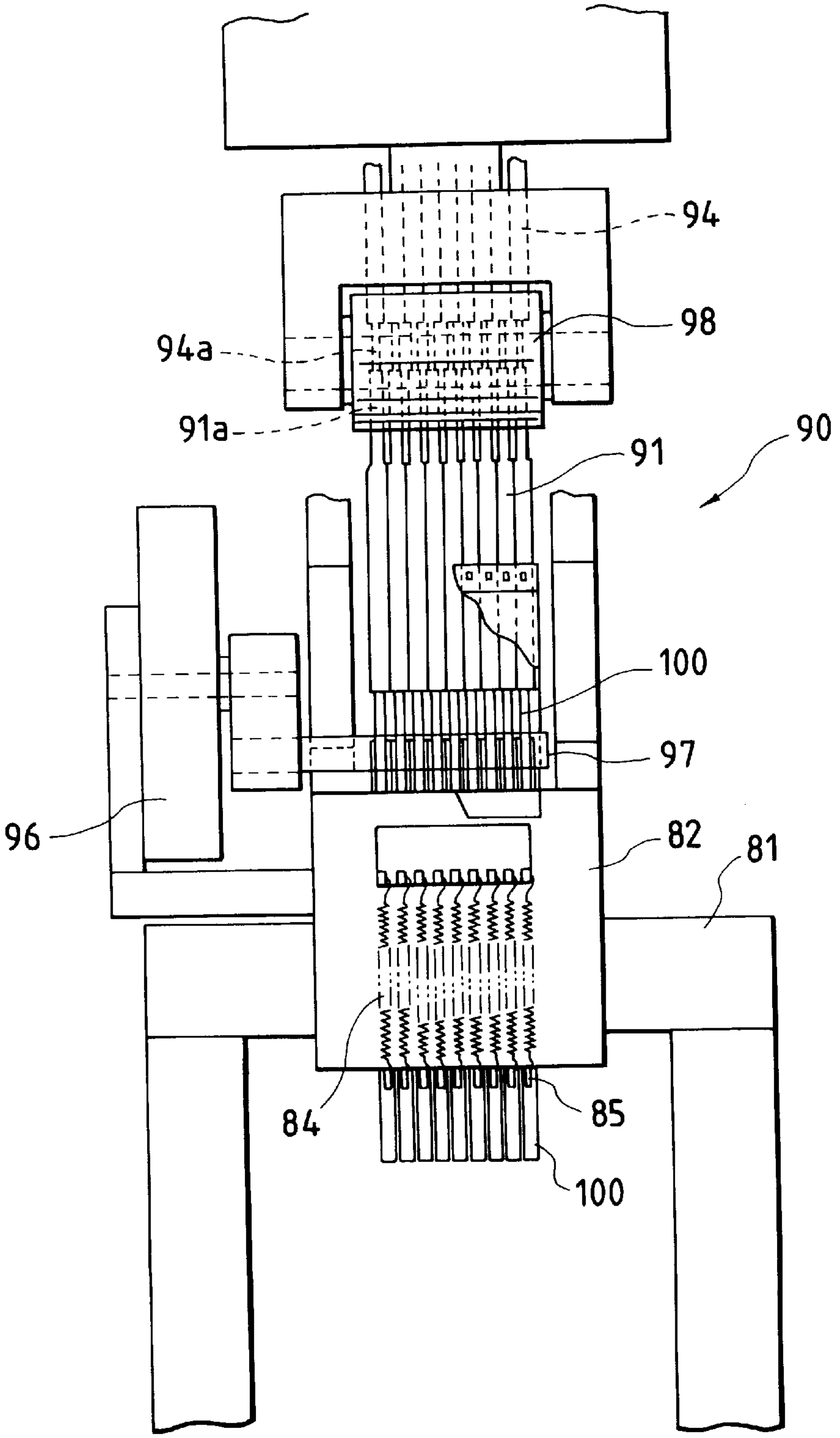
FIG. 24 is a cross-sectional side view of the primary portion of FIG. 22.

This embodiment is different from the above embodiment in the structure of the pressure-blades and the selecting mechanism of the pressure-connecting and wiring machine 70. Since the electrical wire feed section and the manufacturing process of the wire harness of this embodiment are the same as those of the above embodiment, the explanations are omitted here. Referring to FIGS. 22 to 24, only the pressure-blades, the structure of the selecting mechanism to select the pressure-blades and its action will be explained below.

As shown in FIG. 23, the pressure-blade of this embodiment is composed in such a manner that a pressure-connecting blade is formed at the lower end of the belt-shaped member. A predetermined number of pressure-blades are put on each other in the thickness direction and inserted into a rectangular hole 83 of the pressure-blade holding body 82 fixed on the base mount 81. Each blade 100 is hung by a spring 84, so that the blade 100 can be slid along the inner surface of the rectangular hole 83.

Each pressure-blade 100 includes a hooking section 85 at which the spring 84 is hooked. This hooking section 85 protrudes perpendicularly from the belt-shaped body of the pressure-blade. This hooking section 85 comes into contact with the lower surface of the pressure-blade holding body 82, so that the upper dead point of the pressure-blade 100 can be determined.

On the upper surface of the pressure-blade holding body 82, there is provided a selecting mechanism 90 for selecting the pressure-blade 100, and this selecting mechanism 90 is adjacent to a region into which the pressure-blade 100 protrudes from the rectangular hole 83.

In the selecting mechanism 90, there are provided a plurality of selecting plates 91 which correspond to the pressure-blades 100 by one-to-one, and these selecting plates 91 are interposed between a pair of plate-shaped pillars 92. These selecting plates 91 are attached to and rotated round the rotational shaft 93 arranged between the plate-shaped pillars 92.

At the upper position of the rotational shaft 93, there is provided a cylinder 94 for each selecting plate 91 by one-to-one. The rod 94*a* of the cylinder 94 extends and engages with the cutout portion 91*b* formed at the end 91*a* of the selecting plate 91 under the condition that the selecting plate 91 is in an upright posture. Therefore, the selecting plate 91 is held so that it can not be rotated. There is provided a spring 95 which is attached onto this selecting plate 91, and this spring 95 urges the end portion 91*a* of the selecting plate 91, at which the cutout portion 91*b* is formed, so that the end portion 91*a* can be rotated in a direction in which the end portion 91*a* comes into contact with the upper end of the pressure-blade 100.

Accordingly, when the rod 94*a* of the cylinder 94 is retracted and disengaged from the cutout portion 91*b* of the selecting plate 91, the selecting plate 91 is rotated, and the end portion 91*a,* at which the cutout portion 91*b* is formed, comes into contact with the upper end of the corresponding pressure-blade 100 (shown by a chain line in FIG. 23).

In order to return this selecting plate 91, which has been rotated and come into contact with the upper end of the pressure-blade 100, to the initial position, there is provided a returning bar 97, which is driven by the rotary actuator 96 arranged on one of the outer surfaces of the plate-shaped pillar 92. By this returning bar 97, the end portion 91*a* of the selecting plate 91 is moved upward.

As illustrated by one-dotted chain lines in FIG. 23, the above structure is arranged symmetrically with respect to the transverse direction in the drawing. The right and the left structure illustrated by one-dotted chain lines in FIG. 23 respectively correspond to the pressure-blades of the sets A and B.

That is, the electrical wires are connected to the connector $C_1$ with pressure all at once by one of the pressure-blades in the first embodiment, and the electrical wires are respectively connected to the pressure-terminals of the connector $C_2$ with pressure by the other pressure-blades. At this time, in the same manner as that of the first embodiment, there is provided a cutting blade at the side edge portion of the blade on the respective pressure contact side. By this cutting blade, the electrical wires F are cut after the completion of pressure-connection. In FIG. 23, the set of pressure-blades on the side of the cutting blades 100*f* and the selecting mechanism are illustrated by solid lines.

At the upper positions of the above pressure-blades 100, there is provided a pushing roller 98 in a range covering all pressure-blades 100, that is, there is provided a pushing roller 98 all over the length of the arrangement of the pressure-blades 100. This pushing roller 98 pushes only the pressure-blade 100, with the upper end of which the selecting plate 91 comes into contact after the rotation of the selecting plate 91, and the pushing roller 98 pushes the pressure-blade 100 together with the selecting plate 91. When the pushing roller 98 has reached the lower dead point, the pressure blade 100 is inserted into the groove of the connector terminal at this position, so that the electrical wires are connected to the terminal with pressure. Concerning the pressure-blade 100 with which the selecting plate 91 is not contacted, even when the pushing roller 98 is lowered and reaches the lower dead point, the pressure-blade 100 is not pushed downward, so that the electrical wire can not be connected to the connector with pressure.

Although not shown in the drawing, there is provided a sensor at the position where the selecting plate 91 comes into contact with the upper end of the pressure-blade 100 after the rotation of the selecting plate 91 onto the pressure blade 100 side. By this sensor, the pressure blade 100 can be detected.

Although not shown in the drawing, at the position of the pressure-blade 100 protruding from the lower surface of the pressure-blade holding body 82, there is provided a member which is equal to the guide block 13 of the pressure-blade 2, 52 in the first embodiment. Each pressure-blade 100 is inserted into the slit vertically formed in this guide block. Therefore, each pressure-blade 100 is guided by this slit and correctly inserted into the pressure-terminal. Further in this guide block, there is provided a horizontal slit by which the electrical wire F fed from the electrical wire feed section 40 not shown is guided. The structure by which the electrical wire is fed along this slit is the same as that of the aforementioned embodiment.

The structure and action of the pressure-blade 100 and its selecting mechanism of this embodiment are described above. The pressure-blade 100 and its selecting mechanism are incorporated into the pressure-connecting and wiring machine 70 together with the electrical wire feed section 40 shown in the aforementioned embodiment. Then the pressure-connecting and wiring machine 70 and the electrical wire feed section 40 are attached to the moving body and moved. In the same manner as that described in the aforementioned embodiment, after the electrical wires have been connected to one connector $C_1$ with pressure all at once, the pressure-connecting and wiring machine 70 is moved to the other connector $C_2$ only once, that is, wiring is conducted on the other connector $C_2$ only once. After that, only when the selection of the pressure-blades 100 and the pressure-connection of the electrical wires are repeated only on the connector $C_2$ side, it is possible to manufacture a wire harness of cross-wiring.

In this connection, in the above embodiment, the pressure-connection is conducted by one servo motor 21. However, it is possible to individually drive each pressure-blade 2, 52 by an air cylinder so that the pressure-connection can be performed independently. In the above embodiment, a pair of sets of pressure-blades 2, 52 are provided, however, it should be noted that only one set of pressure-blades 2, 52 may be provided.

When the article number of the connector C is different, the specification of the pressure-blades is different. Therefore, it is necessary to use pressure blades 2, 52 meeting the requirement of the connector of the article number. Therefore, it is preferable that the pushing ends of the pressure-blades 2, 52 are formed into removable jigs, and when the jigs are replaced, the pressure-blades can be used for the connector C of a different article number.

Further, it is possible to add the function of setting a cover D of the connector C to the pressure-connecting and wiring machine 70. Alternatively, it is possible to separately arrange a setting machine for setting a cover C'.

The present invention is composed as explained above. Accordingly, it is possible to effectively manufacture a wire harness, the electrical wires arranged between the connectors of which are of the specification of cross-wiring.

The foregoing description of the preferred embodiments of the invention has been presented for the purpose of illustration and description only. It is not intended to be exhaustive or to limit the invention to the precise form disclosed, and modifications and variations are possible in light of and within the scope of the invention. The preferred embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and equivalents thereof.

What is claimed is:

1. An electric wire pressure-connecting machine for a wire harness in which a plurality of electric wires for the wire harness are arranged and connected to connectors with pressure via a plurality of pressure-terminals attached to the connectors, comprising:

a frame;

a plurality of pressure-blades driven by a pressure connecting member and flexibly connected to a driving means attached to the frame, the plurality of pressure-blades arranged corresponding to the plurality of pressure-terminals by one-to-one, each of said pressure-blades being movable independently in a pressure-connecting direction which connects the electric wire to the pressure-terminal with pressure;

a wire guide connected to the frame and having first slits into which the plurality of pressure-blades are inserted and second slits into which the electric wire is inserted;

a selecting mechanism selecting at least one of predetermined pressure-blades from the plurality of pressure-blades, and wherein the selecting mechanism includes a plurality of cylinders provided in end portions side opposite to pushing end portions of the corresponding pressure-blades, and the selected pressure-blade is pushed by the operation of the cylinder corresponding to the pressure-blade, so that the selected pressure-blade protrudes by a predetermined length from the pushing end portions of non-selected pressure blade and the selected at least one predetermined pressure blades are driven by the pressure connecting member to connect the wire.

2. An electric wire pressure-connecting machine for a wire harness according to claim 1, wherein only the at least one of predetermined pressure-blades from the plurality of pressure-blades selected by said selecting mechanism connects the electric wire with pressure.

3. An apparatus for manufacturing a wire harness in which a plurality of electric wires for the wire harness are arranged and connected to connectors with pressure via a plurality of pressure-terminals attached to the connectors, the apparatus comprising:

an electric wire pressure-connecting machine having a frame; and a plurality of pressure-blades driven by a pressure connecting member flexibly connected to a driving means attached to the frame, and the plurality of pressure-blades are arranged corresponding to the plurality of pressure-terminals by one-to-one, each of said pressure-blades being movable independently in a pressure-connecting direction which connects the electric wire to the pressure-terminal with pressure and having a selecting mechanism selecting at least one of predetermined pressure-blades from the plurality of pressure blades, and wherein the selecting mechanism includes a plurality of cylinders provided in end portions side opposite to pushing end portions of the corresponding pressure-blades, and the selected pressure-blade is pushed by the operation of the cylinder corresponding to the pressure-blade, so that the selected pressure-blade protrudes by a predetermined length from the pushing end portions of non-selected pressure-blade and the selected at least one predetermined pressure-blades are driven by the pressure connecting member to connect the wire;

an electric wire supplying device for supplying the plurality of the electric wires to said electric wire pressure-connecting machine;

an electric wire cutting section having a plurality of cutting blades which cuts the electric wires independently; and an electric wire feeding section separately feeding the plurality of the electric wires guided from said electric wire supplying device to said corresponding pressure-blades via said electric wire cutting section.

4. An apparatus for manufacturing a wire harness according to claim 3, wherein said electric wire cutting section and said electric wire feeding section are mounted on said electric wire pressure-connecting machine.

5. An apparatus for manufacturing a wire harness according to claim 3, further comprising:

a pallet accommodating the connector, wherein one of said electric wire pressure-connecting machine and said pallet is relatively movable to the other of said electric wire pressure-connecting machine and said pallet.

6. An apparatus for manufacturing a wire harness according to claim 3, wherein the plurality of pressure blades constitute a first and second group of pressure-blades, and further wherein all the pressure-blades of one of the first and second groups of the pressure-blades are integrally formed with said cutting blades.

* * * * *